United States Patent
Buck

(10) Patent No.: US 9,600,688 B2
(45) Date of Patent: Mar. 21, 2017

(54) PROTECTING DISPLAY OF POTENTIALLY SENSITIVE INFORMATION

(71) Applicant: Lookout, Inc., San Francisco, CA (US)

(72) Inventor: Brian James Buck, Livermore, CA (US)

(73) Assignee: LOOKOUT, INC., San Francisco, CA (US)

( * ) Notice: Subject to any disclaimer, the term of this patent is extended or adjusted under 35 U.S.C. 154(b) by 163 days.

(21) Appl. No.: 14/587,942

(22) Filed: Dec. 31, 2014

(65) Prior Publication Data

US 2015/0113666 A1    Apr. 23, 2015

Related U.S. Application Data

(63) Continuation of application No. 13/741,178, filed on Jan. 14, 2013, now Pat. No. 8,973,149.

(51) Int. Cl.
| | |
|---|---|
| *G06F 21/62* | (2013.01) |
| *G06F 21/50* | (2013.01) |
| *G06F 21/55* | (2013.01) |

(52) U.S. Cl.
CPC .......... *G06F 21/6245* (2013.01); *G06F 21/50* (2013.01); *G06F 21/554* (2013.01); *G06F 2221/032* (2013.01); *G06F 2221/2111* (2013.01)

(58) Field of Classification Search
CPC .............. G06F 21/50; G06F 2221/032; G06F 2221/2111; G06F 21/6245; G06F 21/554
See application file for complete search history.

(56) References Cited

U.S. PATENT DOCUMENTS

| | | |
|---|---|---|
| 8,600,110 B1 | 12/2013 | Chan et al. |
| 2004/0139330 A1* | 7/2004 | Baar ............ G06F 3/0481 713/182 |
| 2004/0233283 A1* | 11/2004 | Kang ............ G08B 13/196 348/143 |
| 2009/0253410 A1 | 10/2009 | Fitzgerald et al. |
| 2010/0205667 A1* | 8/2010 | Anderson ......... G06F 3/013 726/19 |
| 2013/0254874 A1* | 9/2013 | Xu .................. G06F 21/32 726/17 |
| 2014/0028628 A1 | 1/2014 | Hildreth |
| 2014/0078164 A1 | 3/2014 | Chan et al. |
| 2014/0198958 A1* | 7/2014 | Nathan ............ G06F 21/32 382/116 |

* cited by examiner

*Primary Examiner* — Matthew Smithers
(74) *Attorney, Agent, or Firm* — Dergosits & Noah LLP

(57) ABSTRACT

The security and privacy of a user is enhanced by distinguishing between potentially sensitive information and non-sensitive information being displayed on a display of a computing device. In an embodiment, potentially sensitive information on a display is identified by parsing information to be displayed. A front-facing camera of the user's computing device is used to monitor the user's background and compare any changes to a threshold amount. In response to a detected change in the background, actions are taken to alert the user or reduce the visibility of identified potentially sensitive information shown on the display screen.

10 Claims, 37 Drawing Sheets

805 ↘

```
┌─────────────────────────────────────────────────────────────────┐
│ Acquire a first calibration image from the front-facing camera, the first │
│ calibration image being taken at a first position of the front-facing camera, │
│ and including a picture of the user and a first set of objects in the area │
│                               810                               │
└─────────────────────────────────────────────────────────────────┘
                                  │
                                  ▼
┌─────────────────────────────────────────────────────────────────┐
│   Acquire a second calibration image from the front-facing camera, the    │
│  second calibration image being taken at a second position of the front-  │
│   facing camera, different from the first position, and including another │
│ picture of the user and second set of objects in the area, different from the │
│                          first set of objects                          │
│                               815                               │
└─────────────────────────────────────────────────────────────────┘
                                  │
                                  ▼
┌─────────────────────────────────────────────────────────────────┐
│    Compare the first and second calibration images to identify matching   │
│                        pixels and non-matching pixels                     │
│                               820                               │
└─────────────────────────────────────────────────────────────────┘
                                  │
                                  ▼
┌─────────────────────────────────────────────────────────────────┐
│  Designate the matching pixels as a foreground, the foreground thereby    │
│                           including the user                              │
└─────────────────────────────────────────────────────────────────┘
                                  │
                                  ▼
┌─────────────────────────────────────────────────────────────────┐
│              Designate the non-matching pixels as a background            │
│                               830                               │
└─────────────────────────────────────────────────────────────────┘
```

FIG. 8

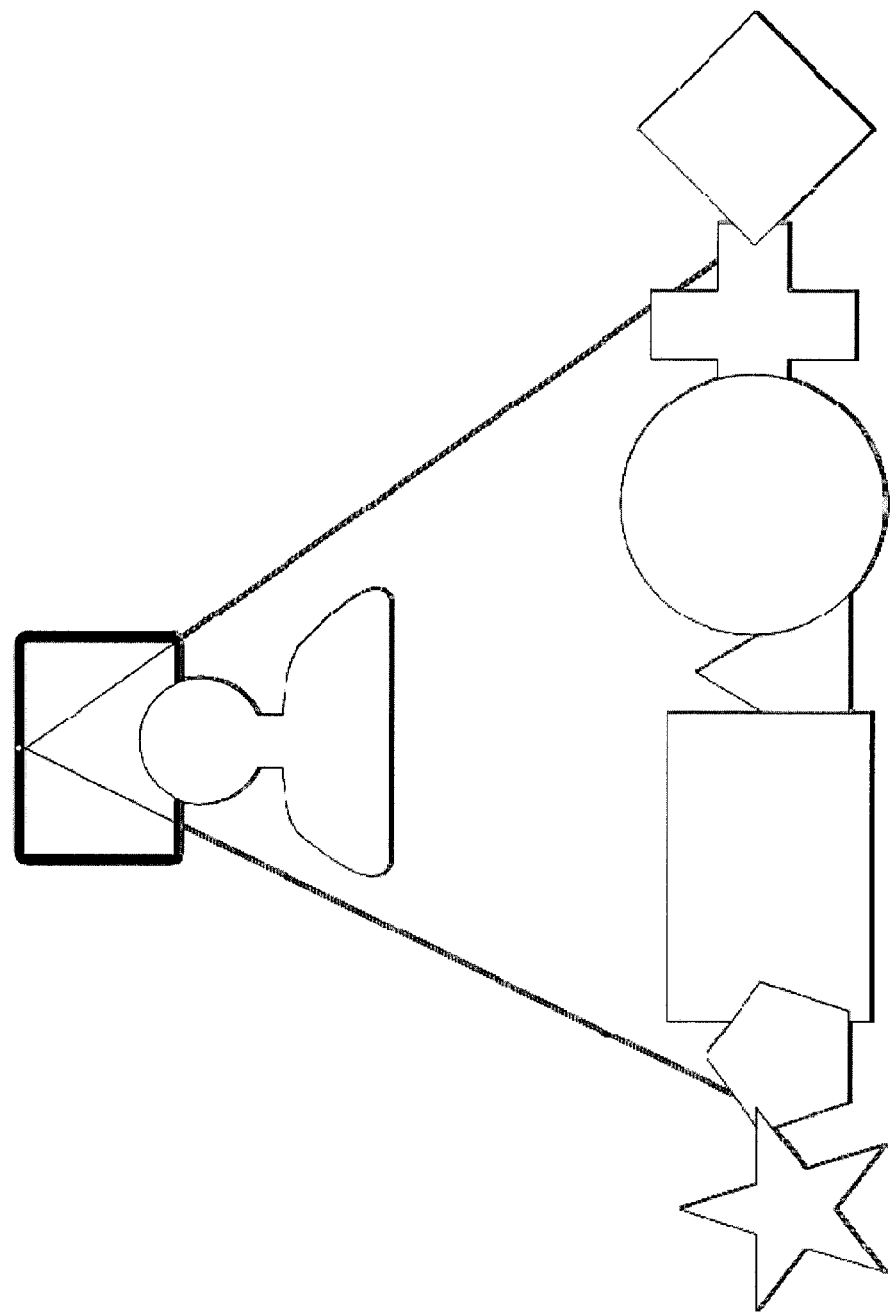

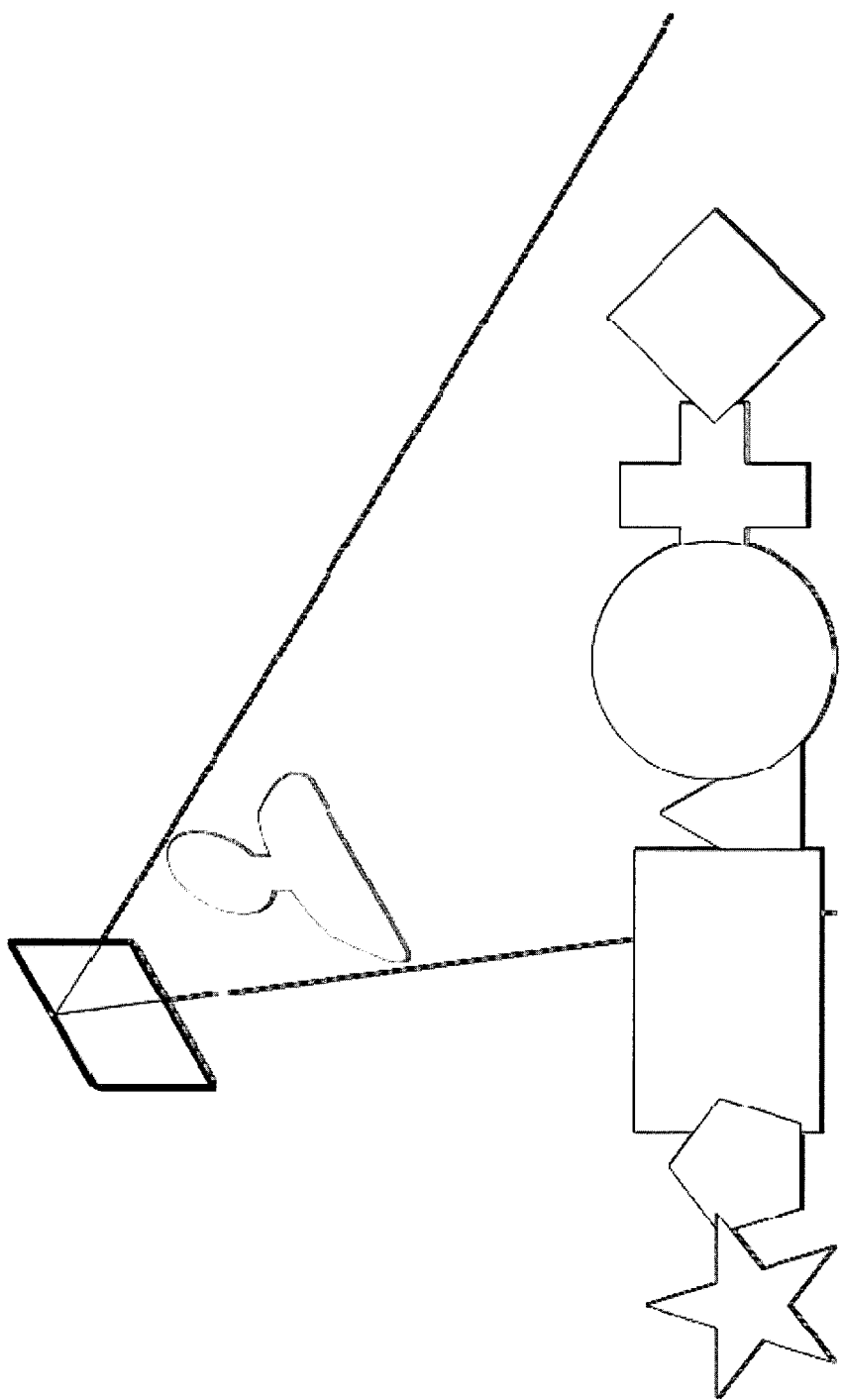

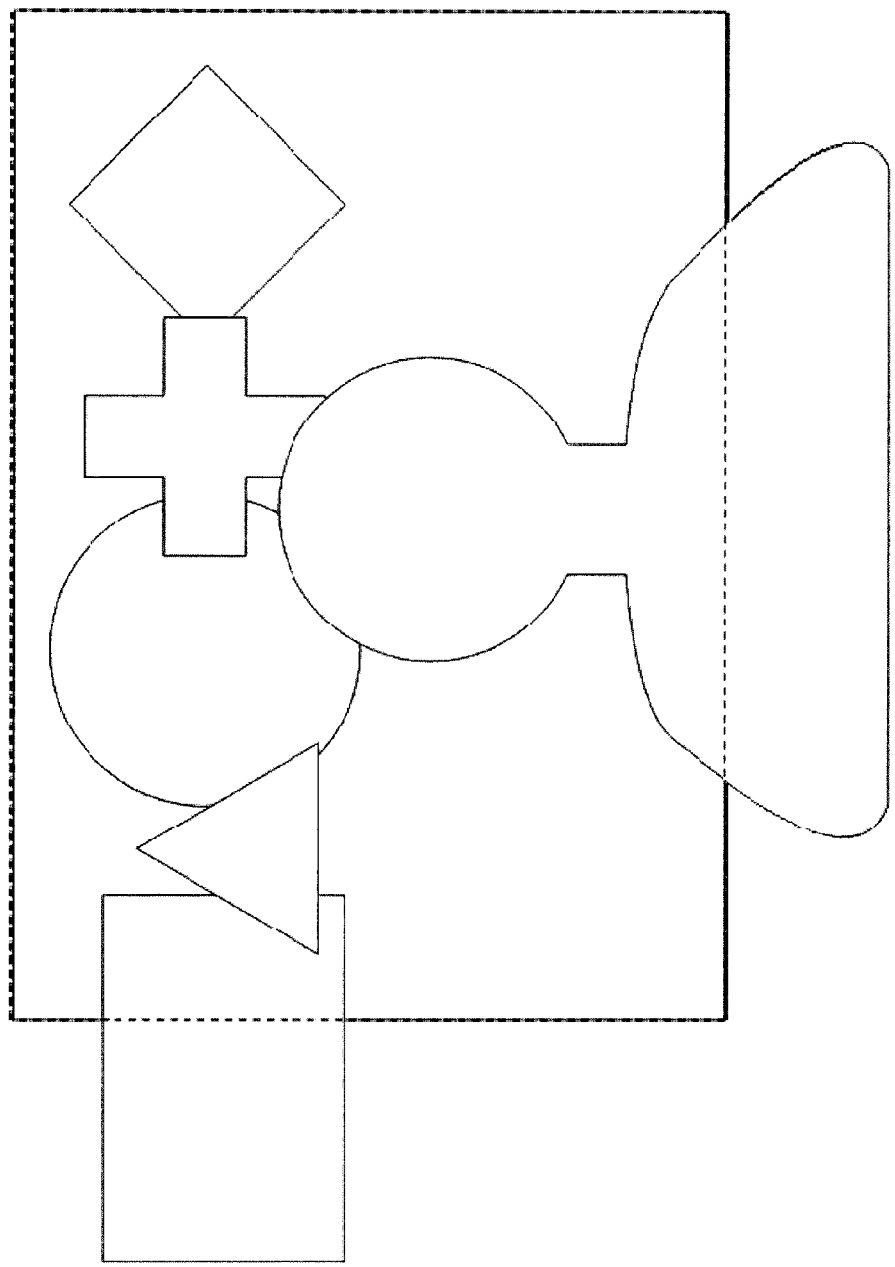

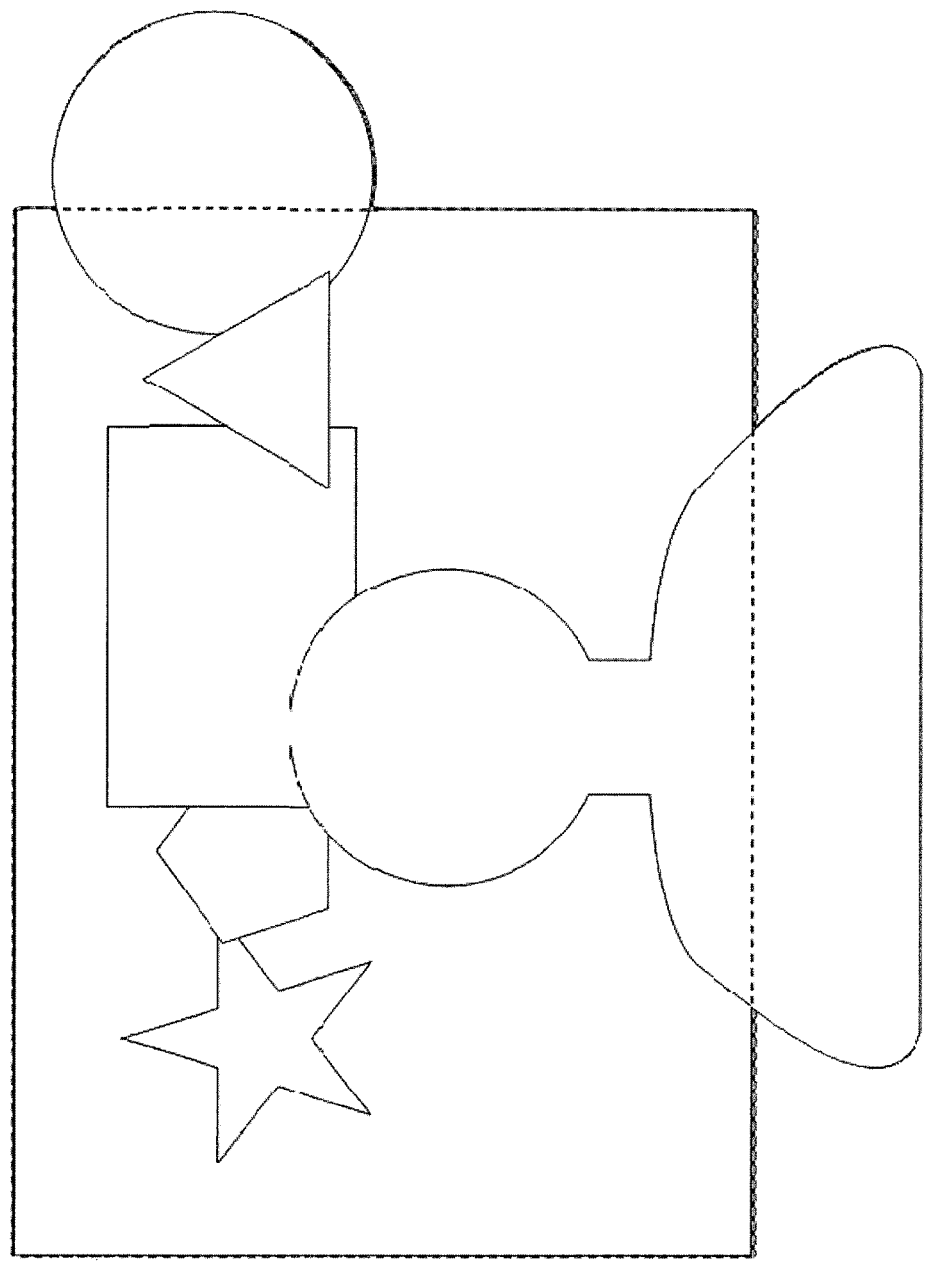

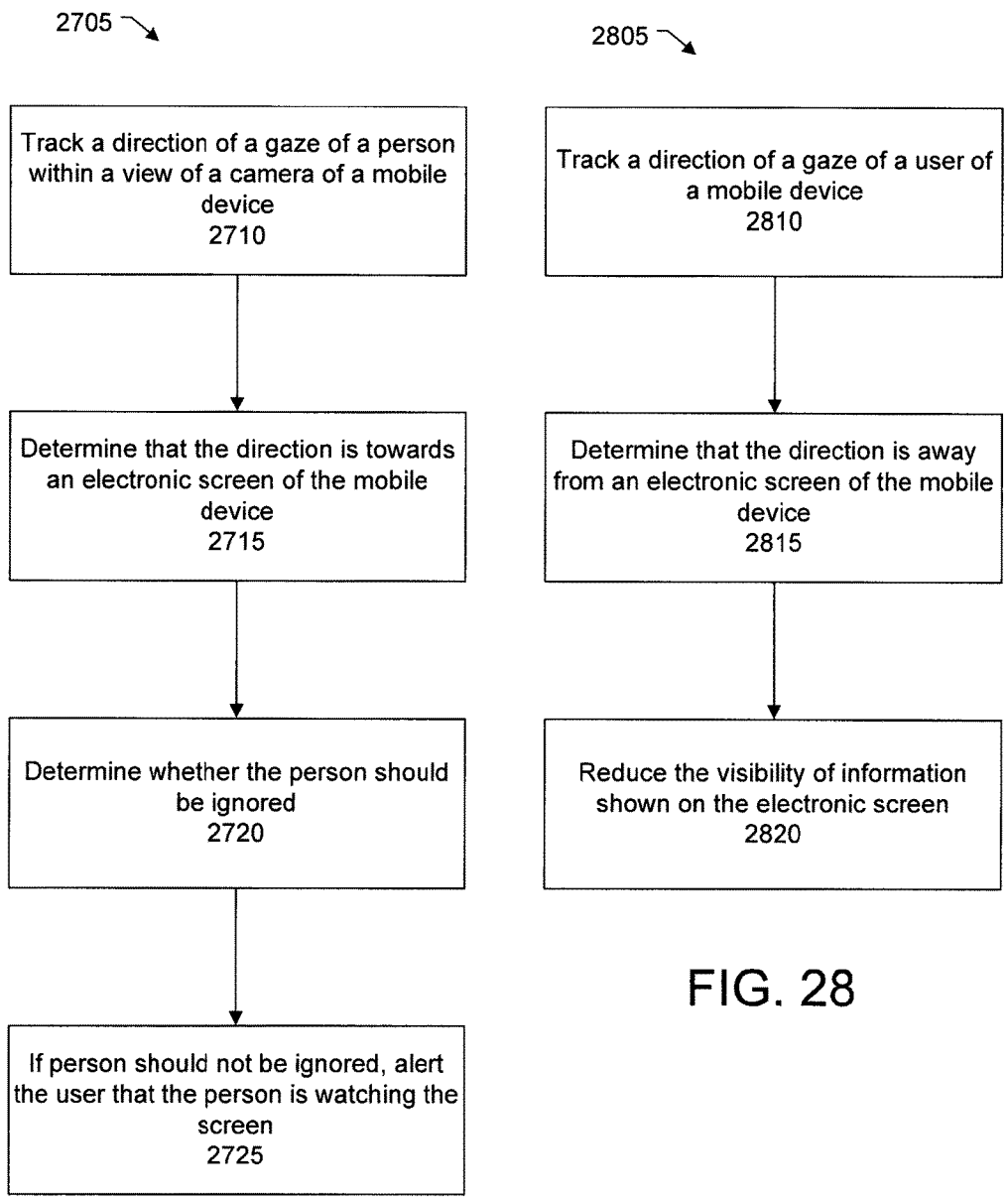

PROTECTING DISPLAY OF POTENTIALLY SENSITIVE INFORMATION

RELATED APPLICATION DATA

This application is a continuation of U.S. patent application Ser. No. 13/741,178, filed on Jan. 14, 2013, now U.S. Pat. No. 8,973,149, issued on Mar. 3, 2015 which is incorporated herein in its entirety.

TECHNICAL FIELD

The present invention relates to the field of information technology, including, more particularly, to systems and techniques for privacy.

BACKGROUND OF THE INVENTION

Identity theft continues to be one of the fastest growing crimes in the world. Experts have estimated the financial losses from identity theft to be upwards of $50 billion. Identity thieves typically target a victim's credit, debit, checking, and saving accounts. Identity fraud, however, has grown to include theft of cell and landline phone service; cable and satellite television service; power, water, gas and electric service; Internet payment service; medical insurance; home mortgages and rental housing; automobile, boat and other forms of financing and loans; and, government benefits. Identity thieves will also use stolen identities to obtain employment and to deceive police when arrested.

Shoulder surfing is one of the ways in which thieves obtain a victim's personal information. Despite its innocuous sounding label, shoulder surfing is of serious concern to anyone who values their privacy. Shoulder surfing refers to a technique where a person glances over the shoulder of another to obtain personal information. Shoulder surfing has become a much greater threat due to the prevalence of smartphones and tablet computers. That person behind you on the bus may be looking over your shoulder to glean private information. This can include, for example, the credit card information you entered while making a purchase using your smartphone or your bank account password when you decided to check your balance. While shoulder surfing is most common in busy and crowded areas where the perpetrator is not as likely to be caught, shoulder surfing can also be done with the aid of binoculars or cameras from a more remote location.

To be sure, not all shoulder surfers have a malicious intent. They may simply be curious or nosey. Still, it can be very uncomfortable to have a stranger stare over your shoulder at your mobile device screen. Thus, there is a need to provide systems and techniques to help keep the information being shown on the device screen private.

BRIEF SUMMARY OF THE INVENTION

The security and privacy of a user is enhanced by monitoring the background environment in which the user is working for changes. In an embodiment, a first or reference image is acquired using a front-facing camera of the user's computing device. A second or target image is acquired using the front-facing camera. The images are compared and an alert is generated if there is a change in background that exceeds a threshold. The change may be a person who has entered the environment and is watching the computing device screen. The alert may include reducing the visibility of information shown on the screen.

Mechanisms are provided for detecting shoulder surfing, and responding to a detection event. Techniques are disclosed for proactive measures to reduce the likelihood of effective shoulder surfing. For many companies protection of customers' privacy is an ongoing concern. The techniques described in this patent application help to mitigate or reduce risk of unintentional exposure of private information. The contents of sensitive fields can be protected dynamically.

In a specific embodiment, a method includes obtaining a first image of an area from a front-facing camera of a computing device, the first image having a foreground and a background, receiving a second image of the area from the front-facing camera, the second image having a foreground and a background, comparing the background of the second image with the background of the first image to identify a change in the background in the second image, and if the change is identified, then alerting a user of the computing device if the change exceeds a predetermined threshold amount.

The step of alerting the user may include obscuring at least a portion of information shown on an electronic screen of the computing device, displaying an image associated with the change on the screen, displaying a notification message on the screen to inform the user of the change, moving an input box from a first position on the screen to a second position on the screen, different from the first position, obscuring a first portion of information shown on the screen and not obscuring a second portion of information shown on the screen, determining that input to a first input field shown on the screen should be protected, obscuring the input to the first input field, determining that input to a second input field shown on the screen does not need to be protected and not obscuring the input to the second input field, or reducing visibility of information shown on the screen.

In a specific embodiment, during the receiving the second image, the second image is not shown on an electronic screen of the computing device. The computing device may include a mobile communications device.

In another specific embodiment, a method includes obtaining a first image of an area from a front-facing camera of a computing device, the first image having a foreground and a background, receiving a second image of the area from the front-facing camera, the second image having a foreground and a background, determining that an object captured in the background of the second image is not in the background of the first image, and upon the determination, alerting a user of the computing device. Alerting the user may include obscuring at least a portion of information shown on an electronic screen of the computing device.

The method may further include after the step of obscuring the at least a portion of information, determining that the object captured in the background of the second image is not in a background of a third image of the area, the third image having been captured by the front-facing camera after the second image, and upon the determination that the object is not in the background of the third image, undoing the obscuring.

The method may further include determining that the user has moved to a different area, obtaining a third image of the different area from the front-facing camera, receiving a fourth image of the different area from the front-facing camera for monitoring of the different area, and in response to determining that the user has moved to the different area, deleting the first image of the area.

In another specific embodiment, a method includes monitoring a position of a mobile communications device having an electronic screen showing information, determining that a tilt from the position exceeds a threshold value, and upon the determination, obscuring at least a portion of the information. The threshold value may be about 8 degrees or about 5 degrees. The threshold value may range from about 5 degrees to about 8 degrees.

In an embodiment, the method further includes after the step of obscuring the at least a portion of the information, determining that the tilt from the position is below the threshold value, and upon the determination that the tilt is below the threshold value, not obscuring the at least a portion of the information.

Other objects, features, and advantages of the present invention will become apparent upon consideration of the following detailed description and the accompanying drawings, in which like reference designations represent like features throughout the figures.

BRIEF DESCRIPTION OF THE FIGURES

FIG. 8 shows another flow for distinguishing between image foreground and background.

FIGS. 10B-10M show examples of a technique for distinguishing between foreground and background.

FIG. 27 shows a flow for determining whether a person should be ignored as a shoulder surfer threat in the second embodiment of the system.

FIG. 28 shows a flow for preemptive protection from shoulder surfing in the second embodiment of the system.

DETAILED DESCRIPTION

Figure 1:
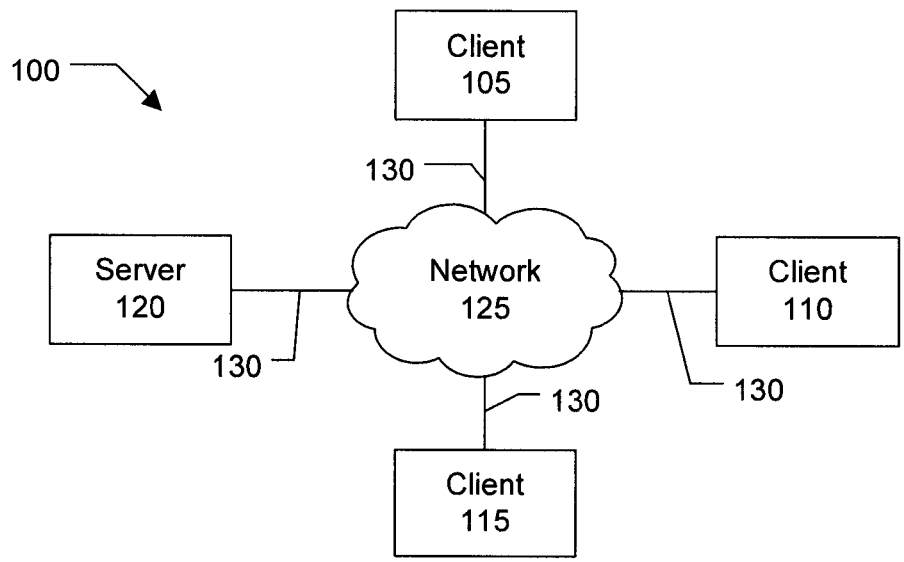
FIG. 1 shows a simplified block diagram of a distributed computing network connecting a server and clients in which a system for protecting information may be implemented.

FIG. 1 is a simplified block diagram of a distributed computer network 100 incorporating a specific embodiment of a system for protecting information shown on a mobile device. Computer network 100 includes a number of client systems 105, 110, and 115, and a server system 120 coupled to a communication network 125 via a plurality of communication links 130. Communication network 125 provides a mechanism for allowing the various components of distributed network 100 to communicate and exchange information with each other.

Communication network 125 may itself be comprised of many interconnected computer systems and communication links. Communication links 130 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, Internet telephony, IP telephony, digital voice, voice over broadband (VoBB), broadband telephony, Voice over IP (VoIP), public switched telephone network (PSTN), and others. While in one embodiment, communication network 125 is the Internet, in other embodiments, communication network 125 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment and does not limit the scope of the systems and methods as recited in the claims. One of ordinary skill in the art would recognize other variations, modifications, and alternatives. For example, more than one server system 120 may be connected to communication network 125. As another example, a number of client systems 105, 110, and 115 may be coupled to communication network 125 via an access provider (not shown) or via some other server system.

Client systems 105, 110, and 115 typically request information from a server system which provides the information. Server systems by definition typically have more computing and storage capacity than client systems. However, a particular computer system may act as both a client or a server depending on whether the computer system is requesting or providing information. Aspects of the system may be embodied using a client-server environment or a cloud-cloud computing environment.

Server 120 is responsible for receiving information requests from client systems 105, 110, and 115, performing processing required to satisfy the requests, and for forwarding the results corresponding to the requests back to the requesting client system. The processing required to satisfy the request may be performed by server system 120 or may alternatively be delegated to other servers connected to communication network 125.

Client systems 105, 110, and 115 enable users to access and query information or applications stored by server system 120. Some example client systems include desktop computers, portable electronic devices (e.g., mobile communication devices, smartphones, tablet computers, laptops) such as the Samsung Galaxy Tab®, Google Nexus devices, Amazon Kindle®, Kindle Fire®, Apple iPhone®, the Apple iPad®, Microsoft Surface®, the Palm Pre™, or any device running the Apple iOS™, Android™ OS, Google Chrome OS, Symbian OS®, Windows Mobile® OS, Windows Phone, BlackBerry OS, Embedded Linux, webOS, Palm OS® or Palm Web OS™.

In a specific embodiment, a "web browser" application executing on a client system enables users to select, access, retrieve, or query information and/or applications stored by server system 120. Examples of web browsers include the Android browser provided by Google, the Safari® browser provided by Apple, Amazon Silk® provided by Amazon, the Opera Web browser provided by Opera Software, the BlackBerry® browser provided by Research In Motion, the Internet Explorer® and Internet Explorer Mobile browsers provided by Microsoft Corporation, the Firefox® and Firefox for Mobile browsers provided by Mozilla®, and others (e.g., Google Chrome).

Figure 2:
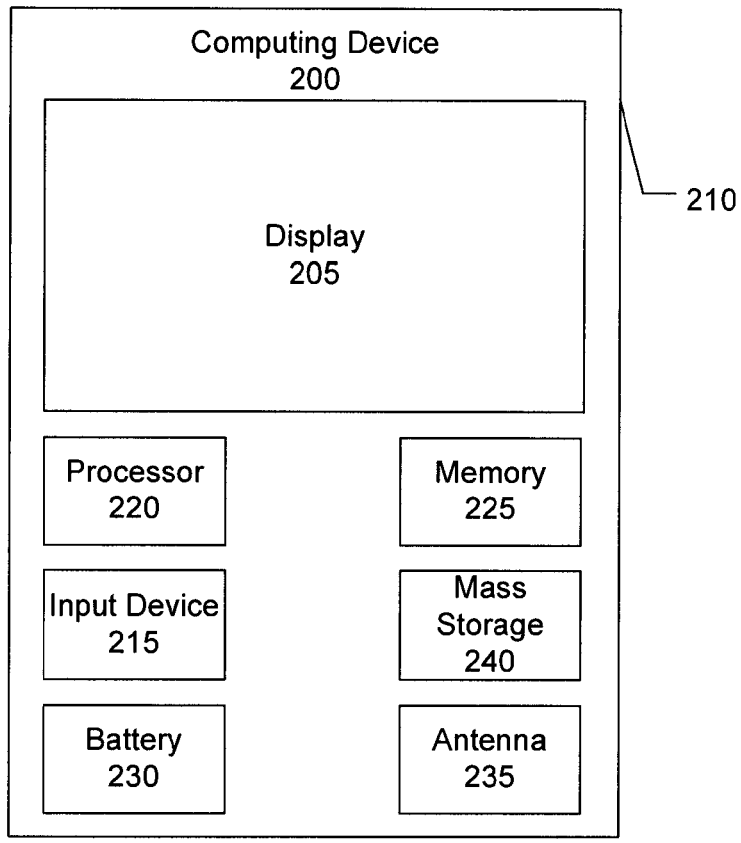
FIG. 2 shows a more detailed diagram of an example of a client.

FIG. 2 shows an example of a computer system such as a client system. In an embodiment, a user interfaces with the system through a client system, such as shown in FIG. 2. Mobile client communication or portable electronic device 200 includes a display, screen, or monitor 205, housing 210, and input device 215. Housing 210 houses familiar computer components, some of which are not shown, such as a processor 220, memory 225, battery 230, speaker, transceiver, antenna 235, microphone, ports, jacks, connectors, camera, input/output (I/O) controller, display adapter, network interface, mass storage devices 240, and the like.

Input device 215 may also include a touchscreen (e.g., resistive, surface acoustic wave, capacitive sensing, infrared, optical imaging, dispersive signal, or acoustic pulse recognition), keyboard (e.g., electronic keyboard or physical keyboard), buttons, switches, stylus, or combinations of these.

Mass storage devices 240 may include flash and other nonvolatile solid-state storage or solid-state drive (SSD), such as a flash drive, flash memory, or USB flash drive. Other examples of mass storage include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), battery-backed-up volatile memory, tape storage, reader, and other similar media, and combinations of these.

The system may also be used with computer systems having different configurations, e.g., with additional or fewer subsystems. For example, a computer system could include more than one processor (i.e., a multiprocessor system, which may permit parallel processing of information) or a system may include a cache memory. The computer system shown in FIG. 2 is but an example of a computer system suitable for use. Other configurations of subsystems suitable for use will be readily apparent to one of ordinary skill in the art. For example, in an embodiment, the computing device is mobile communication device such as a smartphone or tablet computer. Some specific examples of smartphones include the Droid Incredible and Google Nexus One, provided by HTC Corporation, the iPhone or iPad, both provided by Apple, and many others. The computing device may be a laptop or a netbook. In another embodiment, the computing device is a non-portable computing device such as a desktop computer or workstation.

A computer-implemented or computer-executable version of the program instructions useful to practice the systems and techniques described in this application may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software useful to practice the techniques described in this application may be stored or reside in RAM or cache memory, or on mass storage device 240. The source code of this software may also be stored or reside on mass storage device 240 (e.g., flash drive, hard disk, magnetic disk, tape, or CD-ROM). As a further example, code useful for practicing the techniques described in this application may be transmitted via wires, radio waves, or through a network such as the Internet. In another embodiment, a computer program product including a variety of software program code to implement features described in this application is provided.

Computer software products may be written in any of various suitable programming languages, such as C, C++, C#, Pascal, Fortran, Perl, Matlab (from MathWorks, www.mathworks.com), SAS, SPSS, JavaScript, CoffeeScript, Objective-C, Objective-J, Ruby, Python, Erlang, Lisp, Scala, Clojure, and Java. The computer software product may be an independent application with data input and data display modules. Alternatively, the computer software products may be classes that may be instantiated as distributed objects. The computer software products may also be component software such as Java Beans (from Oracle) or Enterprise Java Beans (EJB from Oracle).

An operating system for the system may be the Android operating system, iPhone OS (i.e., iOS), Windows Phone, Symbian, BlackBerry OS, Palm web OS, bada, Embedded Linux, MeeGo, Maemo, Limo, or Brew OS. Other examples of operating systems include one of the Microsoft Windows family of operating systems (e.g., Windows 95, 98, Me, Windows NT, Windows 2000, Windows XP, Windows XP x64 Edition, Windows Vista, Windows 7, Windows 8, Windows CE, Windows Mobile, Windows Phone 7, Windows Phone 8), Linux, HP-UX, UNIX, Sun OS, Solaris, Mac OS X, Alpha OS, AIX, IRIX32, or IRIX64. Other operating systems may be used.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system useful in practicing the systems and methods in this application using a wireless network employing a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

Figure 3:
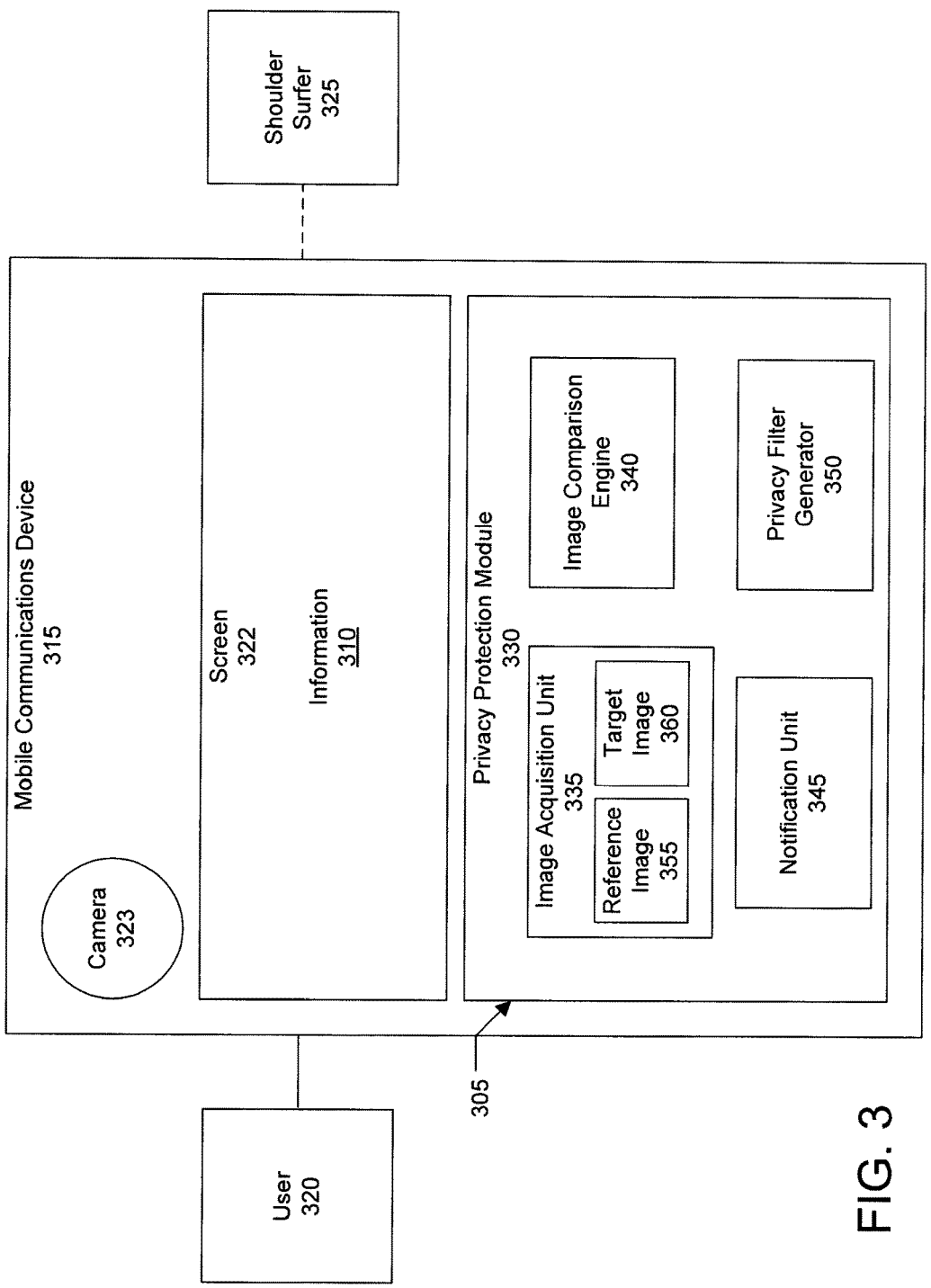
FIG. 3 shows a block diagram of a first embodiment of a system that detects changes in background to prevent shoulder surfing.

FIG. 3 shows a block diagram of an environment in which a system 305 for protecting information 310 on a mobile communications device 315 of a user 320 may be used. A front surface of the device includes a screen 322 and a camera 323 (e.g., front-facing camera). The information is displayed on the screen so that the user can view the information. In many cases, the user may be using the device in public. For example, the user may be holding and using the device while on a bus, train, airplane, or while waiting in line to make a purchase. The user may have set the device on a table such as on a table in a coffee shop or restaurant. Public spaces can often be crowded with other people including strangers. Because the mobile device may be used in close proximity to strangers, it can be very easy for a stranger to look at the information being shown on the user's mobile device. Such person may be referred to as a shoulder surfer 325.

Shoulder surfers are people who are able to observe information displayed on a screen of a device, unbeknownst to the device user. Potentially private information may be exposed to watchers. A feature of the system helps to prevent exposure of sensitive information to prying eyes. In some cases, a shoulder surfer may simply be nosey. But, in other cases, the shoulder surfer may have a more malicious intent such as wanting to steal the user's identity. The shoulder surfer may be looking for credit card information, personal identification numbers (PINs), social security numbers, and other personal information.

In an embodiment, system 305 includes a privacy protection module 330 that includes an image acquisition unit 335, an image comparison engine 340, a notification unit 345, and a privacy filter generator 350. In a specific embodiment, the protection module is implemented in a mobile application program or app. The application program may be available for download on a mobile application marketplace or distribution platform. Some examples of application marketplaces include the Apple App Store, Google Play, Amazon Appstore, Windows Phone Store, and BlackBerry App World. The module can execute as a background service or application to help protect information being displayed on the screen by another application program.

In an embodiment, the module is implemented as a privacy feature for an application program referred to as Lookout Mobile Security and provided by Lookout of San Francisco, Calif. Lookout is a smartphone security company that provides products and services to protect users from viruses, malware, and spyware, backup and restore data, and to locate lost or stolen phones. Lookout has millions of users across 400 mobile networks in 170 countries and counting. In another embodiment, the protection module is embedded in the operating system of the mobile device.

The image acquisition unit is responsible for obtaining a reference image 355 and a target image 360 from the camera. In an embodiment, the user, prior to beginning work, holds the device in their hand while the camera captures the reference image. Because the camera is a front-facing camera, the reference image typically will include a representation of the user in a foreground of the reference image and other objects within a field of view of the camera. These other objects will be in a background of the reference image. The objects will include things behind or indirectly behind the user. The other objects making up the background of the reference image depend on the area or environment in which the user is using the device. For example, if the user is in a coffee shop, the background objects may include an espresso machine, tables, chairs, wall art, cash register, and so forth.

After the user begins their work, the target image is acquired. As discussed above, because the camera is a front-facing camera, the target image typically will include another representation of the user in a foreground of the target image, and other objects in a background of the target image.

The image comparison engine compares the background of the target image with the background of the reference image to detect any changes. For example, the background of the target image may include a person (e.g., stranger or shoulder surfer) who was not present in the reference image. The comparison engine can identify the background change.

In an embodiment, the change in background triggers an alert from the notification unit. The notification unit is responsible for alerting the user of the background change. The alert can include displaying a message on the screen to inform the user of the background change, capturing an image of the change and displaying the image of the change on the screen, or both. For example, the image of the change can include a picture of the person present in the target image, but not present in the reference image (see e.g., FIG. 19). The person, because of their location, may be able to view (or may already be viewing) the device's screen.

The privacy filter generator is responsible for reducing the visibility of information shown on the device's screen when a change in background has been detected. In an embodiment, the generator renders a graphical overlay, window, screen, or region that blocks or at least partially blocks the information being shown on the screen of the device. Instead or additionally, the generator can mask an input field. For example, characters and values (e.g., numbers) input into the input field may be replaced by asterisks, dots, symbols, or other characters or values as a substitute or placeholder for the inputted information. Reducing the visibility of the information helps to secure the information from the potentially prying eyes of the person detected in the target background.

Figure 4:
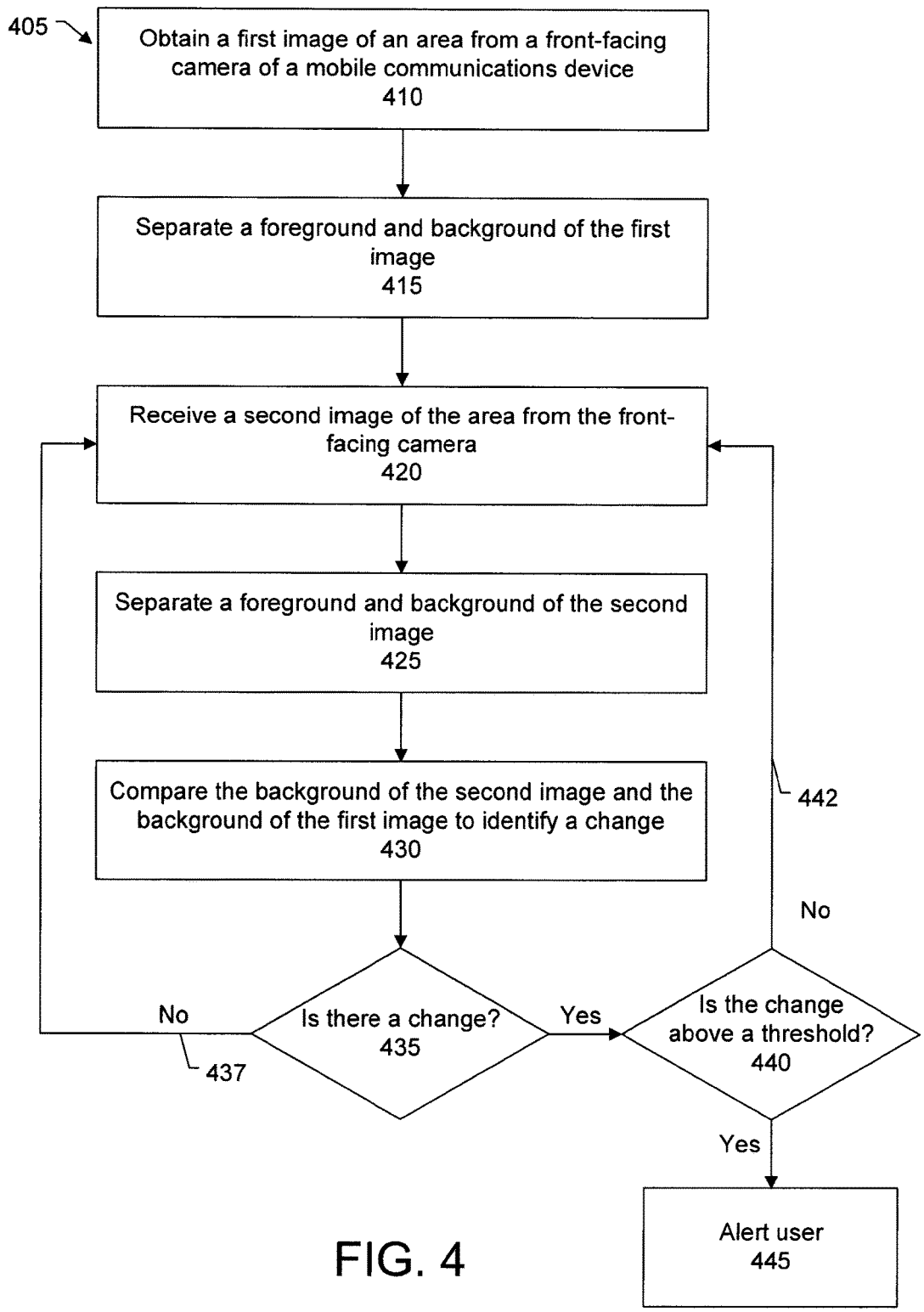
FIG. 4 shows a flow for the first embodiment of the system.

FIG. 4 shows an overall flow 405 for monitoring the background environment in which the user is using the device for any changes. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In brief, in an embodiment, the mobile user satisfies themselves that the environment is free of shoulder surfers and begins work. The system takes note of the background in the camera. Background is part of the image that is not the user's face or hands or other body parts. As long as the background stays substantially the same user is ok. If the system detects any change in the background then privacy measures are initiated.

More particularly, in a step 410, the system obtains a first image of an area from a front-facing camera of a mobile communications device. The first image may be referred to as a reference image. In a step 415, the system distinguishes a foreground and background of the first (or reference) image. As discussed above, the image will typically include a representation of the user in the foreground and other objects that may be in the background. Distinguishing the foreground and background helps to ensure that changes in the foreground (e.g., user moves their head and hands) do not trigger an alert. That is, it can be desirable to ignore changes in foreground or subtract out the foreground so as to not trigger a false alert.

In a specific embodiment, a ranging or proximity sensor (e.g., infrared (IR) detector) is used to help designate what pixels of the image belong to the foreground (i.e., pixels representing the user) and what pixels of the image belong to the background. The ranging sensor may be built-in the device such as part of the device camera. Alternatively, the ranging sensor may be an external accessory that is attached to the device. An IR ranging sensor can emit a pulse of IR light. The light travels out and hits an object (e.g., user). The light is then reflected and is detected by a detector of the ranging sensor. Based on the angle of the reflected light, a distance to the object can be calculated. In this specific embodiment, pixels representing an object closest or nearest to the sensor can be designated as foreground pixels because the object is likely to be the user. Pixels representing objects further away from the sensor can be designated as background pixels.

Figure 5:
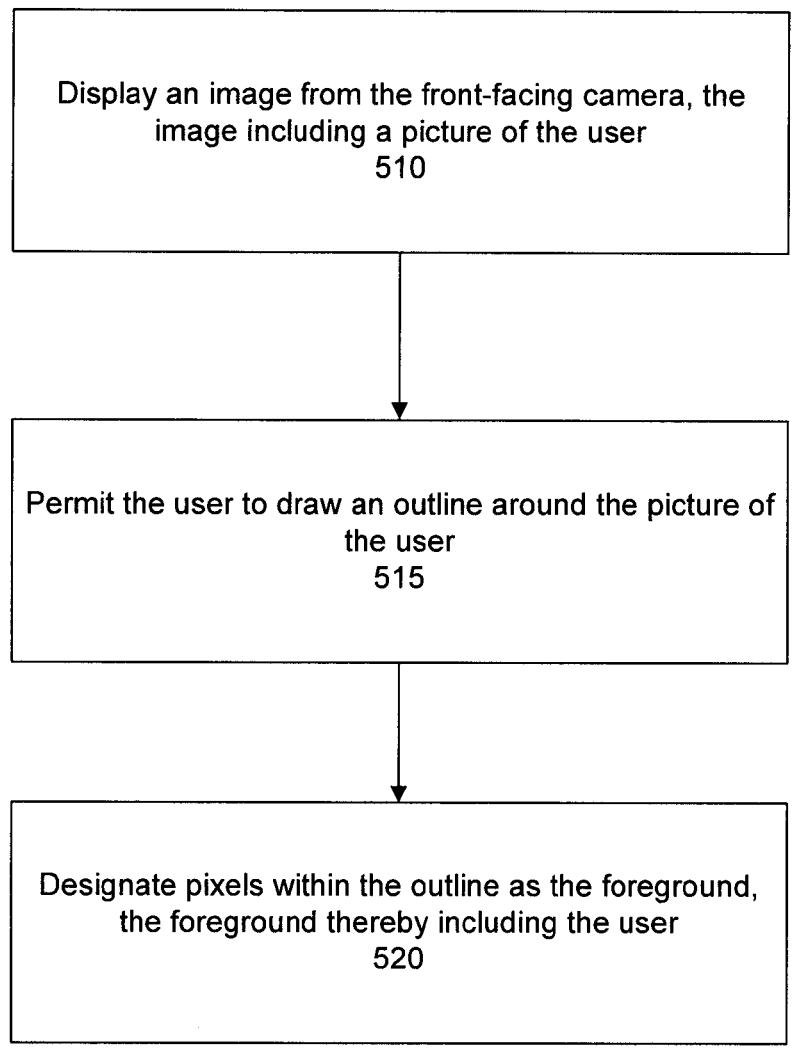
FIG. 5 shows a flow for distinguishing between image foreground and background in the first embodiment of the system.
Figure 6:
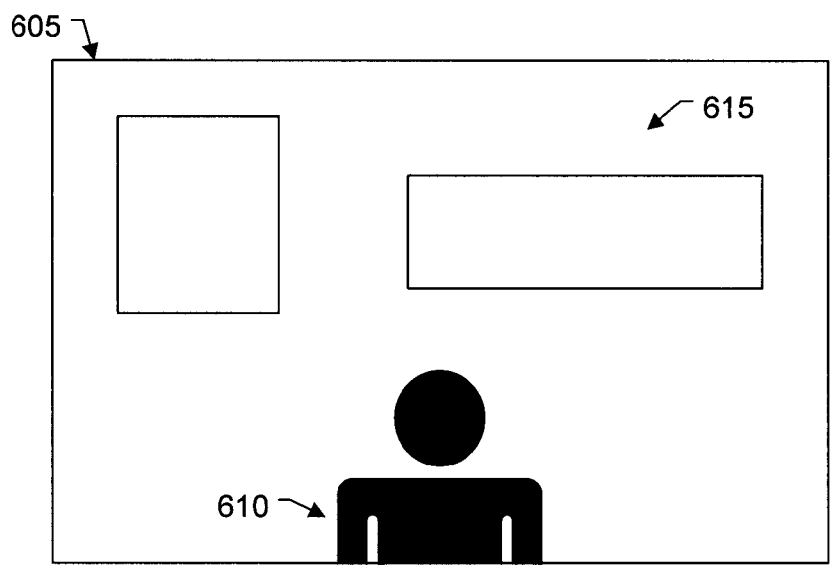
FIG. 6 shows an example of an image depicting the user in a foreground of the image and other objects in a background of the image.

In some cases, however, a ranging sensor may not be available. FIG. 5 shows a flow 505 of another specific embodiment to distinguish foreground and background without using a ranging sensor. In a step 510, the system displays an image (e.g., first or reference image) from the front-facing camera on the device screen. FIG. 6 shows an example of an image 605 that may be displayed. This image includes a picture or representation of the user 610 and other objects 615 that may be within a field of view of the camera.

Figure 7:
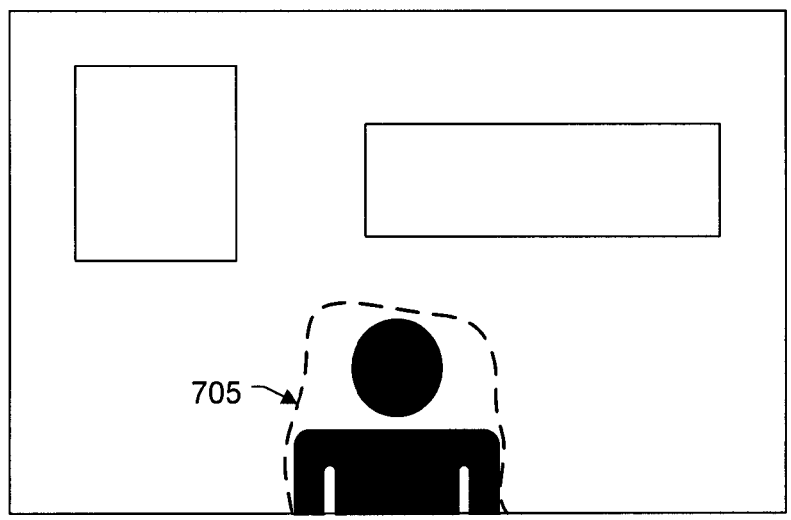
FIG. 7 shows an example of the image in FIG. 6 with the foreground having been identified.

In a step 515 (FIG. 5), the system permits the user to draw an outline around the picture of the user. The user may use a finger, stylus, or both to trace their outline on the image. FIG. 7 shows an example of an outline 705 that the user has drawn around their picture. Instead or additionally, the user may identify themselves by drawing a box around their picture, cropping the image, or both.

In a step 520, the system designates pixels within the outline (or box or cropped image) as the foreground, the foreground thereby including the user. Pixels outside of the outline (or box or cropped image) may be designated as the background.

Figure 9:
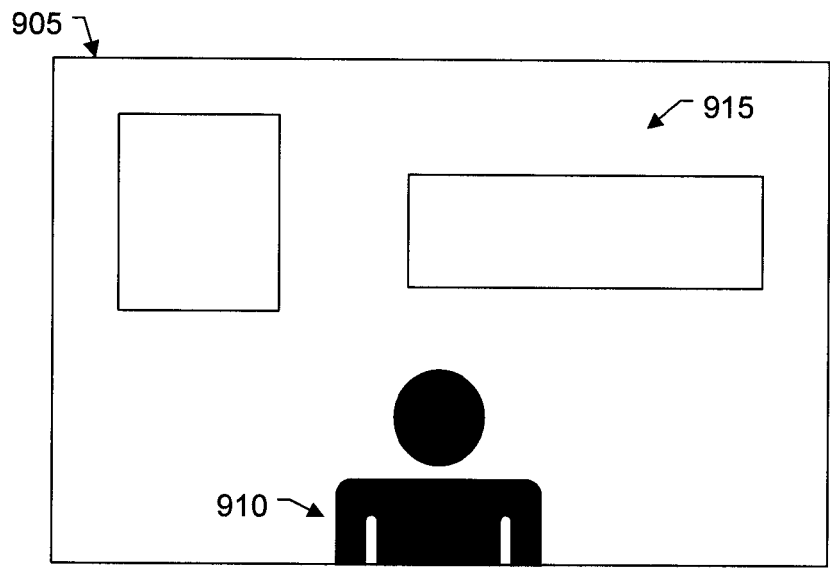
FIG. 9 shows a first calibration image for the flow shown in FIG. 8.

FIG. 8 shows a flow 805 of another specific embodiment to distinguish foreground and background. This flow may be referred to as an enrollment, registration, or configuration procedure. In a step 810, the system acquires a first calibration image from the front-facing camera. The first calibration image is taken at a first position of the front-facing camera and includes a picture of the user and a first set of objects within the field of view of the camera at the first position. FIG. 9 shows an example of a first calibration image 905. The image includes a picture 910 of the user and a first set of objects 915 that may be in the area.

Figure 10A:
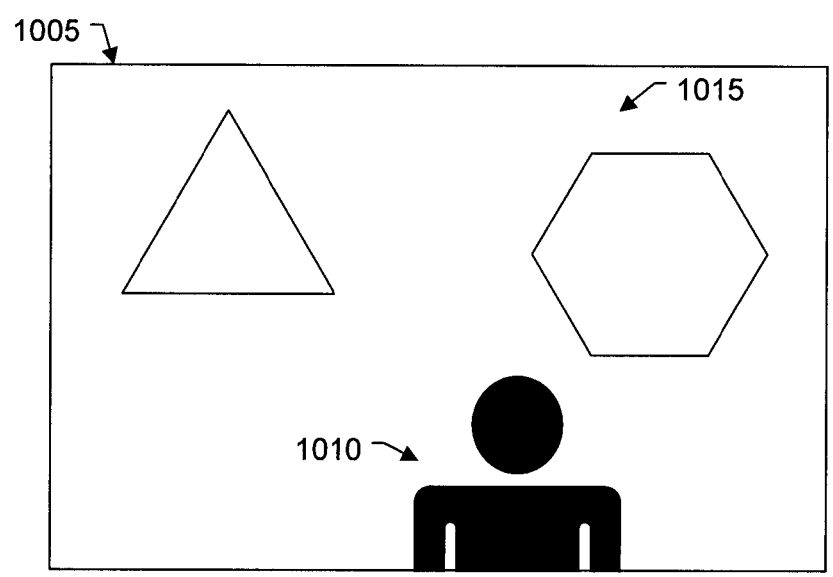
FIG. 10A shows a second calibration image for the flow shown in FIG. 8.

Referring now to FIG. 8, after the first calibration image is acquired, in a step 815 the user can swivel around, tilt the device, or both in order for the system to acquire a second calibration image from the front-facing camera. FIG. 10A shows an example of a second calibration image 1005. The second calibration image is taken at a second position of the front-facing camera, different from the first position, and includes another picture 1010 of the user and a second set of objects 1015, different from the first set of objects.

In a step 820 (FIG. 8), the system compares the first and second calibration images to identify matching pixels and non-matching pixels. A pixel in the first calibration image and a pixel in the second calibration image can be matched based on pixel color, other pixel data, or both. In a step 825, the system designates the matching pixels as a foreground, the foreground thereby including the user. In a step 830, the system designates the non-matching pixels as a background. Comparing the first and second calibration images may include analyzing parallax. Parallax is a displacement or difference in the apparent position of an object viewed along two different lines of sight, and is measured by the angle or semi-angle of inclination between those two lines. The flow example in FIG. 8 shows two calibration images being acquired. There can be more than two calibration images that are acquired. Having more than two calibration images can improve the accuracy of distinguishing between foreground and background.

FIGS. 10B-10M provide further detail describing the actions in which (a) a "swivel" operation of the device (user stays in same position and rotates the device on a vertical axis through the center of the device) can view different pixels, seeing the user/foreground against different background, and being able to identify the background; and (b) a "rotate" operation (user holding device rotates both user and device with respect to the background) can do the same.

In FIG. 10B we see the device, with a front mounted camera (small white dot on device) looking at the user (outline of a person's head and shoulders) and a background consisting of different geometric shapes. It is to be understood that the geometric shapes are simply diagrammatic conventions to explain the operation, the background can be any set of objects, surfaces, etc.

Figure 10C:
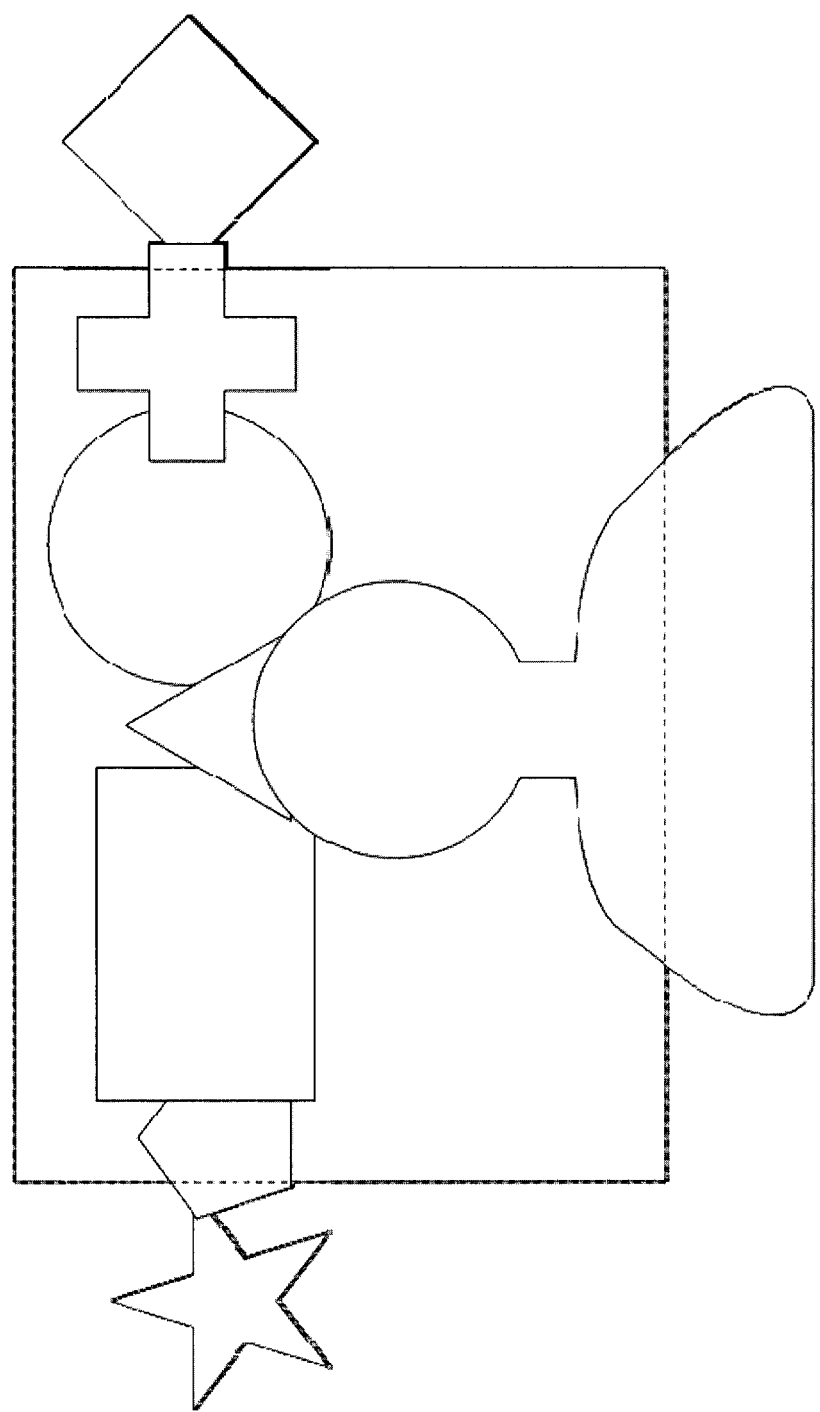

In FIG. 10C, we can see what is viewed in this situation by the device camera. The device camera sees the user in the foreground, and the background objects that are within view (inside the large rectangle). The user performs a swivel operation, rotating the device about a vertical axis running through the device; the portion of the user seen by the camera is different, and the portion of the background seen is different (but overlapping). Because the background overlaps, the system can register the portions of the two images by identifying the same pixel values between the two images.

Figure 10D:
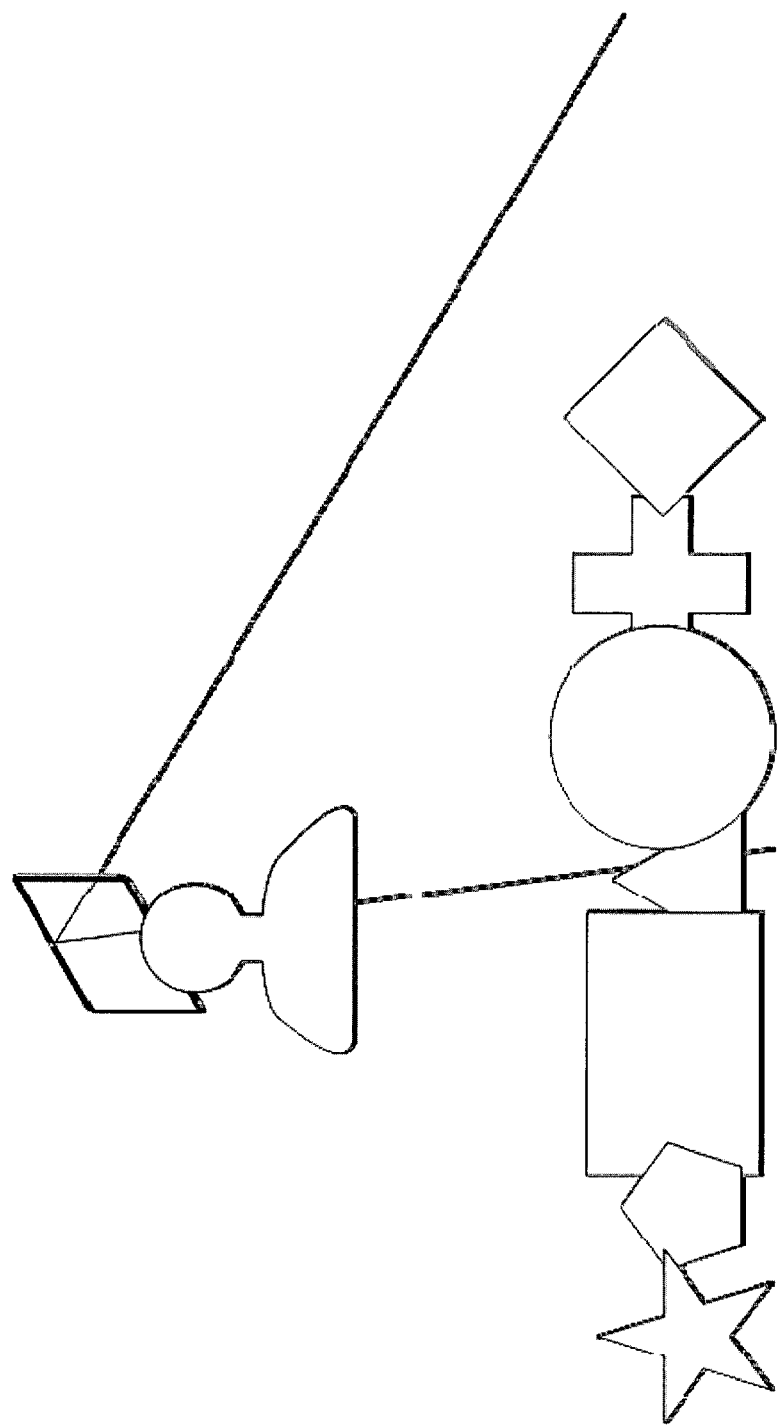
Figure 10E:
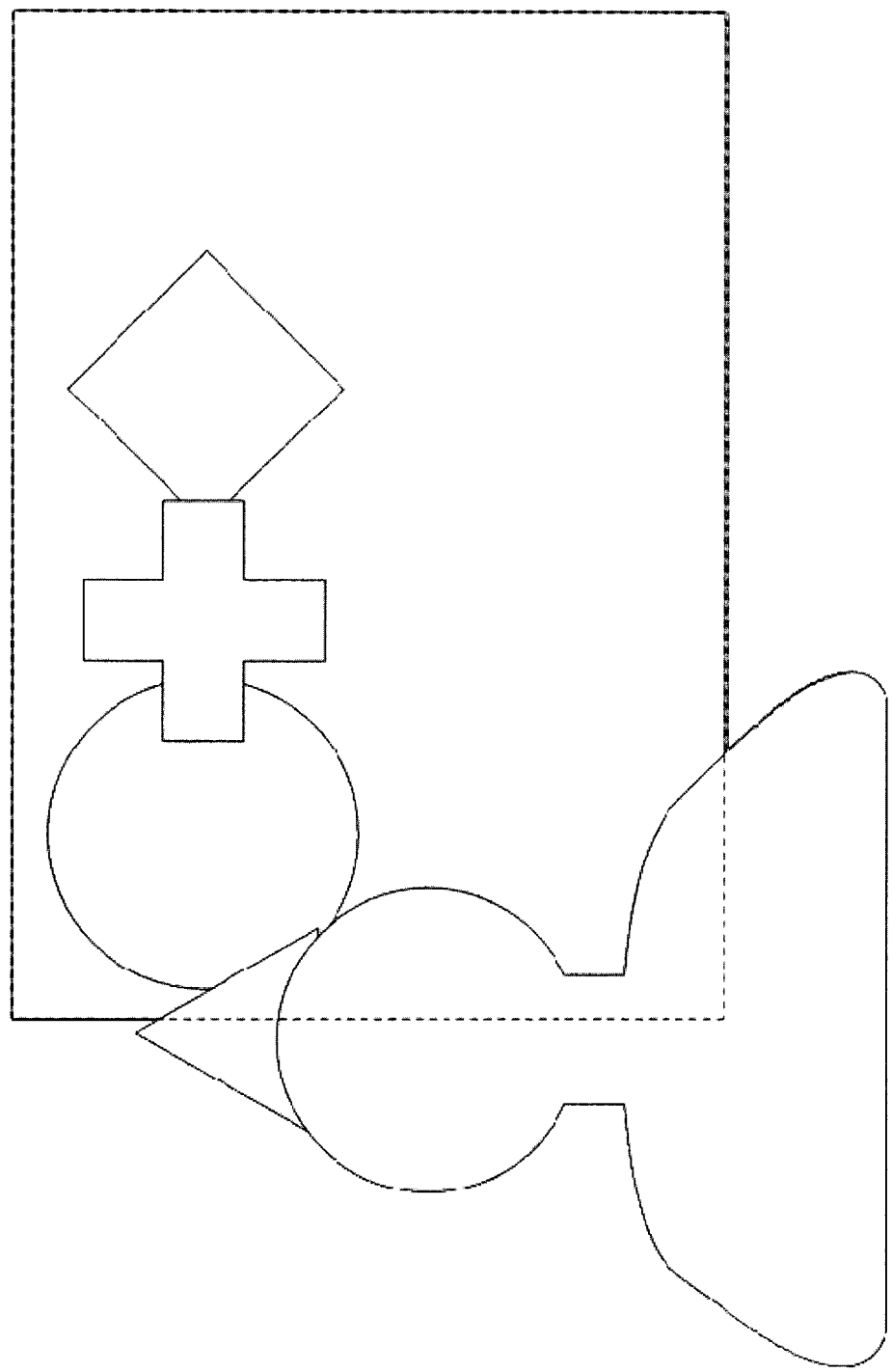

The diagram of the swivel operation is shown in FIG. 10D. The image seen by the camera in this situation is shown in FIG. 10E (inside the large rectangle).

Figure 10F:
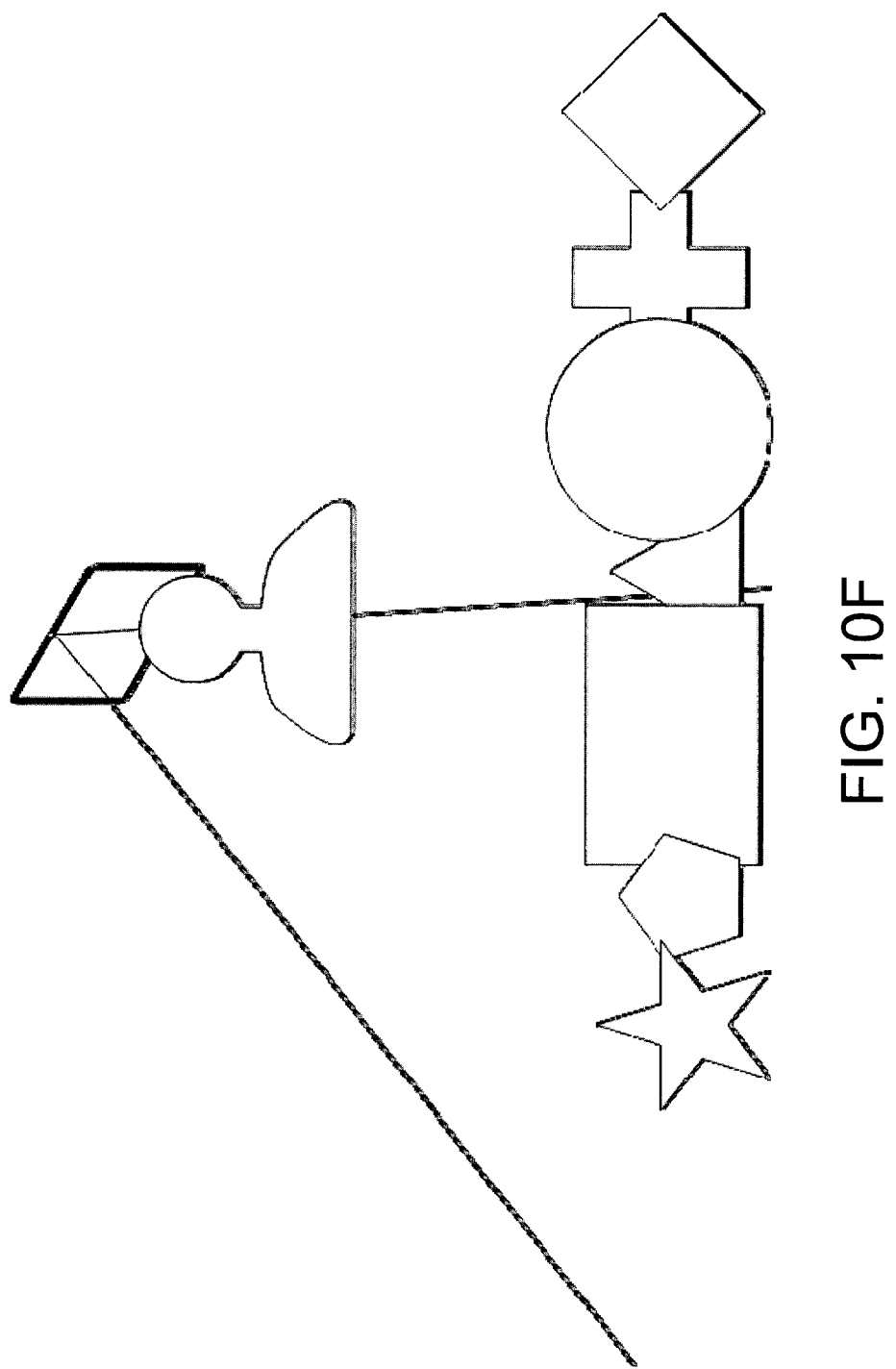
Figure 10G:
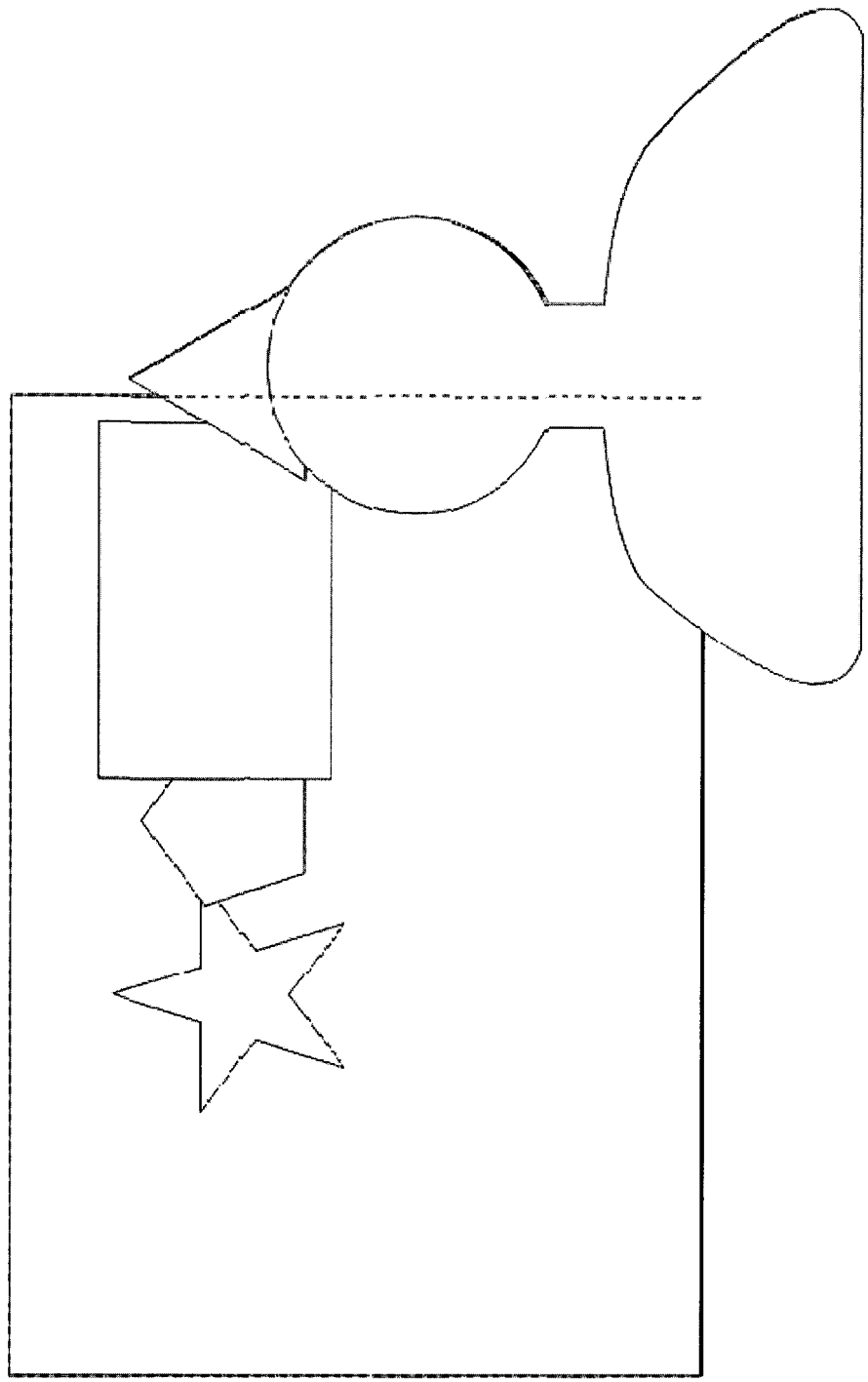

A second swivel operation is shown in FIG. 10F. The image seen by the camera after the second swivel operation is shown in FIG. 10G.

Figure 10J:
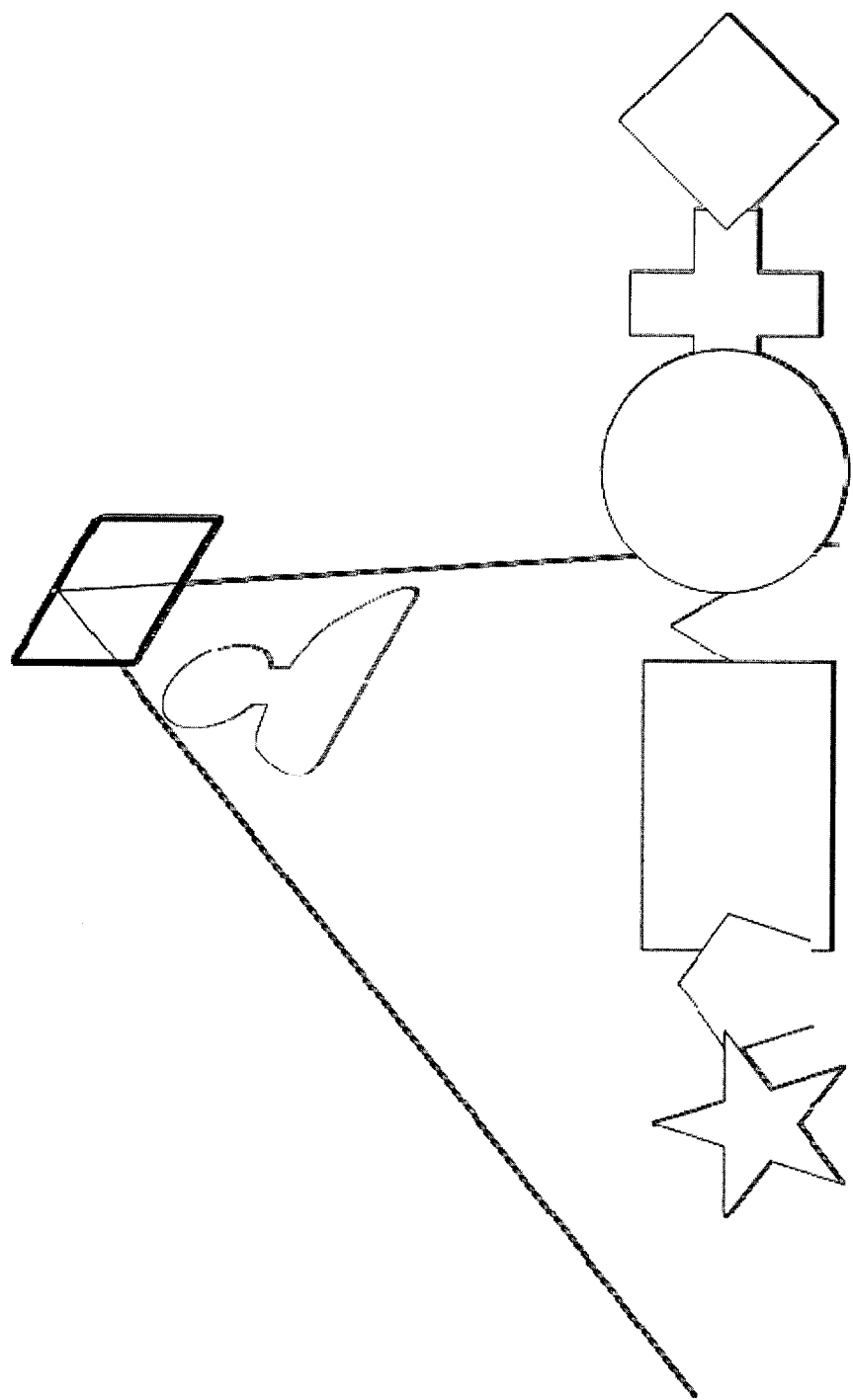

A rotate operation (in which both the device and the user rotate with respect to the background, e.g., think of a user holding the device in front of the user, and sitting in a chair that rotates, and then rotating the chair, which results in a rotation of both the user and the device) is shown in FIG. 10H. The image seen by the camera is shown in FIG. 10I. A second rotate operation is shown in FIG. 10J. The image seen by the camera after this rotate operation is shown in FIG. 10K.

Figure 10L:
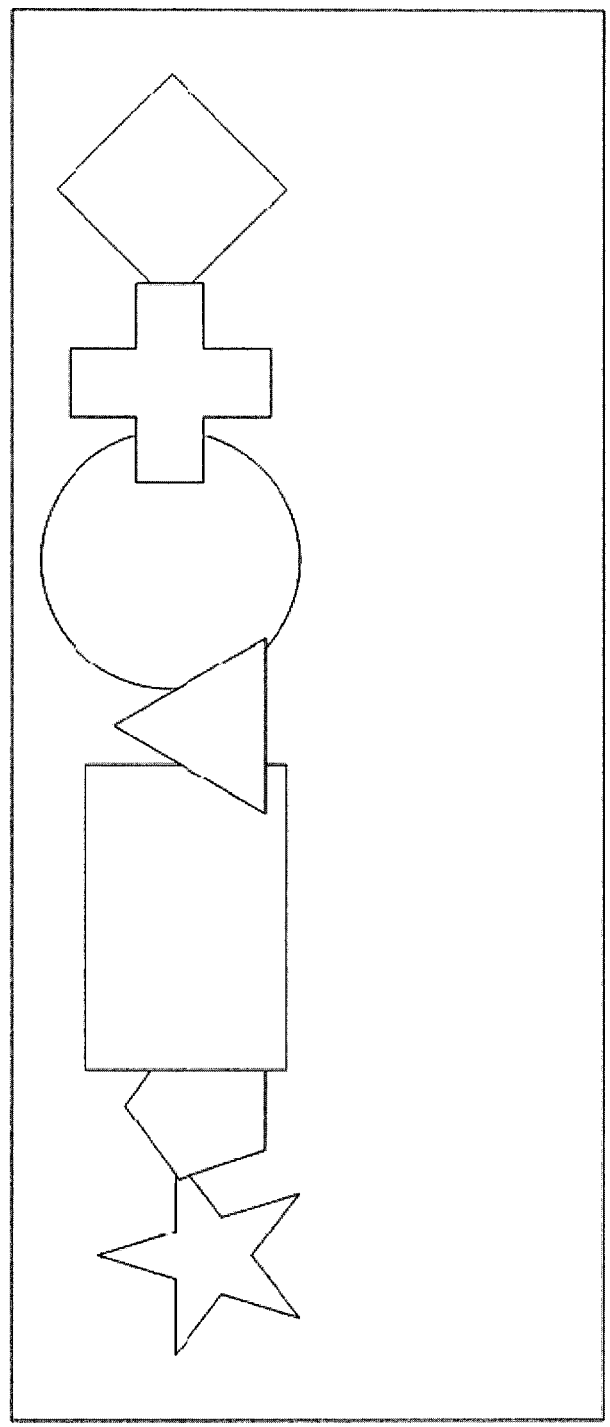

By aligning the different images based on the background pixel values, the system can construct an image of the background (without the foreground user); an example is shown in FIG. 10L.

Figure 10M:
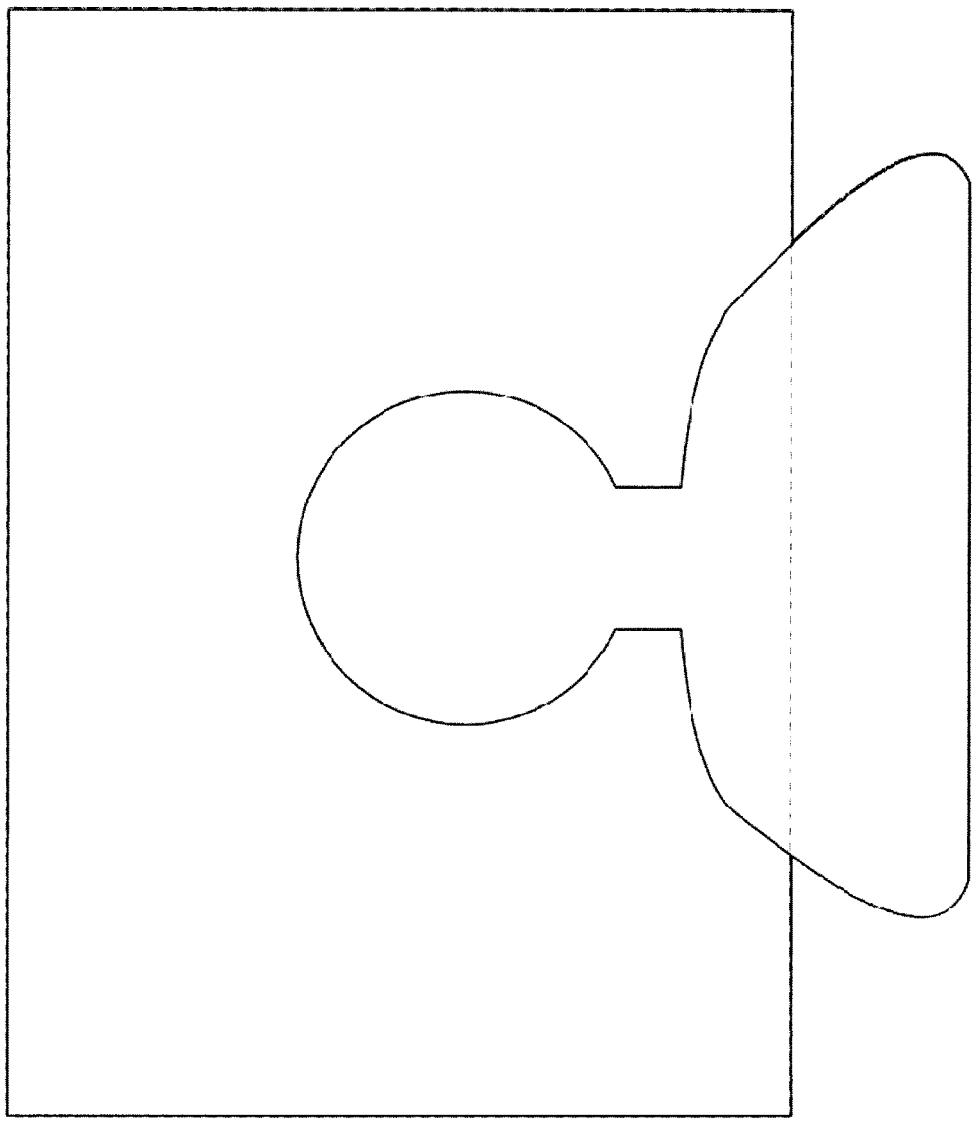

Similarly it is possible to identify the pixels that are due to the foreground object (the user) by this same process as shown in FIG. 10M.

In subsequent images obtained from the camera, the system knows what pixel values and general shape are due to the foreground object (the user) and can ignore them as far as any operation of determining if there is a change in the image due to something changing or appearing in the midground or background. Similarly, because the system now knows what the background looks like, the system can easily detect changed pixel values different from the ones previously obtained for the background.

In detecting changes, the system can make allowance for small differences in pixel values due to slightly altered illumination; e.g., pixel value changes of 5 percent or even 10 percent (a configurable threshold) may be allowed and ignored as far as detecting image changes. Also, the system can make allowance for small differences in pixel values occurring spatially in the image next to the detected foreground object, which could be due to slight changes in orientation of the foreground object with respect to the device camera. The distance (in pixels) from the detected foreground object for such an allowance could be, for example, 10 pixels, and is configurable. In detecting changes, the system can choose to ignore small regions of different pixel values; e.g., a region smaller than 10 pixels by 10 pixels could be ignored when there is a change in pixel values; the size of such a region to be ignored is configurable.

The swivel and rotate operations described above involved rotations about a vertical axis, but the same operation applies when there are rotations about any combination of x, y, and z axes.

Referring now to FIG. 4, in a step 420, the system receives a second image of the area from the front-facing camera. The second image may be referred to as a target image. The image can be a still image or a frame of a live video stream as captured by the front-facing camera. A live video stream can allow for real-time or near real-time monitoring of the area in which the user is working. Capturing a stream of live video, however, can consume more computing resources (e.g., battery power) than capturing a still image. With a still image, there may be slight delay between the stranger entering the area and a still image capturing of the stranger. The system may be configured to capture images at periodic intervals such as every 1, 2, 3, 4, or 5 seconds. The frequency of image capture can be user-configurable. A longer delay between image capture can consume less computing resources than a shorter delay between image captures. A longer delay, however, can increase the time between the stranger entering the area and the user being alerted.

In an embodiment, the system allows the user to configure whether the second or target image is to be a still image or live video. A user who is very security conscious may opt for live video. A user who prioritizes battery life may instead opt for still image capture.

In an embodiment, the second image is received without the second image being displayed on the screen of the mobile device. In other words, in this embodiment, during the receiving of the second image, the second image is not shown on the device screen. This allows background monitoring to occur without occupying screen real estate. A user can be working on their device and viewing information on the screen (e.g., viewing their banking account) while the system unobtrusively monitors the area in which the user is working.

In a step 425, the system separates the foreground region of the second image from the background region. In an embodiment, separating the foreground from the background includes subtracting out pixels in the second image identified as belonging to the user (see step 415).

In steps 430 and 435, the system compares the background of the second image and the background of the first image to identify or determine whether there has been a change in the background. In other words, the system can determine whether the background of the second image is the same as or different from the background of the first image. If there has not been a change (i.e., the backgrounds are the same), the system loops 437 back to step 420 to continue to monitor the area.

If there has been a change (i.e., the backgrounds are different), the system determines whether the change exceeds a threshold (step 440). If the change does not exceed the threshold, the system loops 442 back to step 420 to continue monitoring the area. If the change exceeds the threshold, the system alerts the user (step 445). The threshold can be a predetermined value or amount. Having the threshold helps to reduce the number of false positives. The threshold can be configurable by the user. Users who are very security conscious may set a lower threshold with the trade-off being a potentially higher number of false positives. Users who are less security conscious may set a higher threshold that may provide for fewer false positives.

Figure 11:
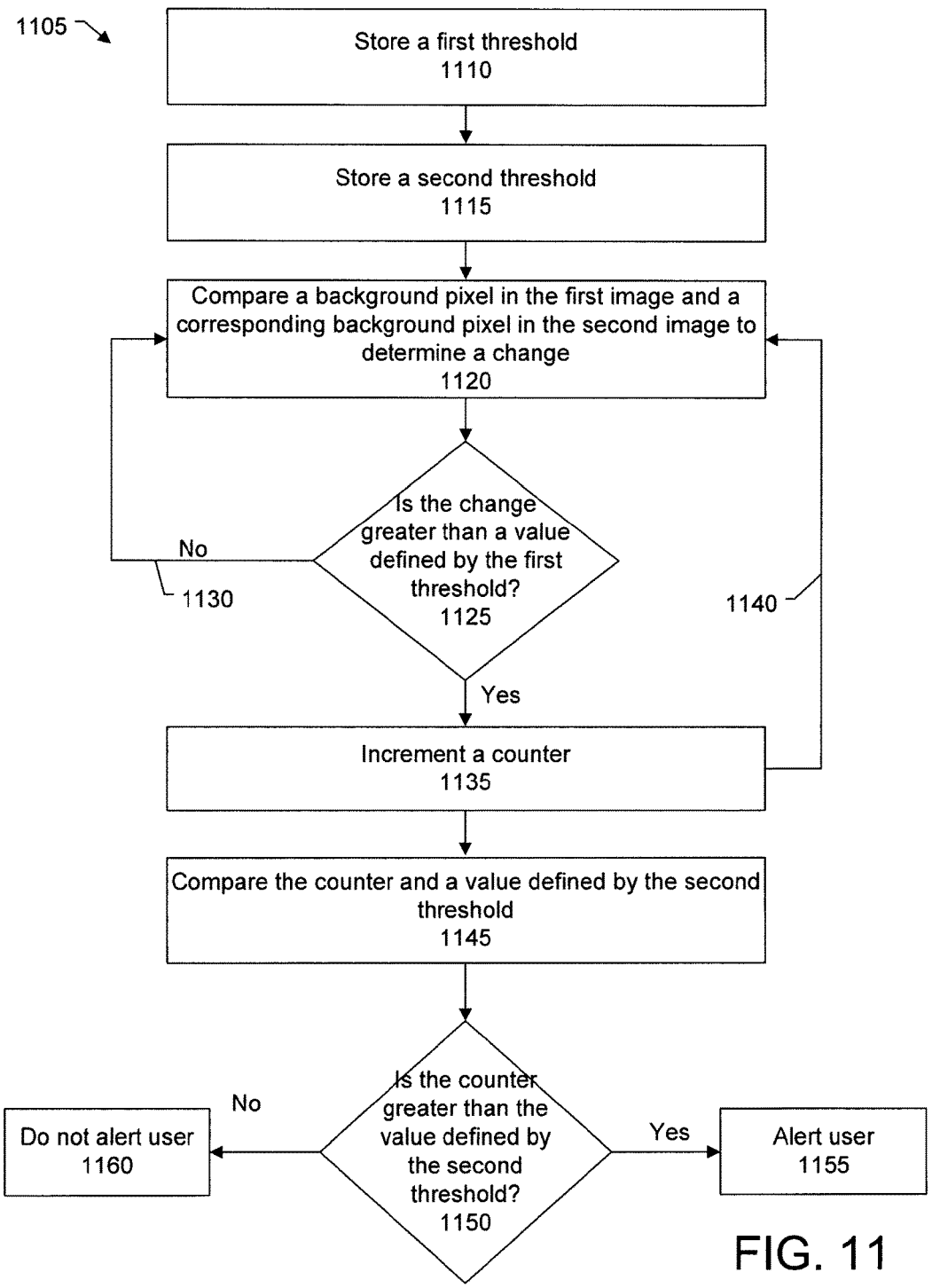
FIG. 11 shows a flow for detecting an overall change in background for the first embodiment of the system.

Referring now to FIG. 11, in a specific embodiment, the threshold includes two predetermined threshold components in order to determine an overall change. FIG. 11 shows a flow 1105 for determining overall change between backgrounds of the first (or reference) and second (or target) images. In steps 1110 and 1115, the system stores first and second predetermined threshold amounts, respectively. In an embodiment, the predetermined thresholds can be user-configurable. The system can provide default thresholds which may be overridden by the user.

In a step 1120, the system compares a background pixel in the first image with a corresponding background pixel in the second image to determine a change or difference between the background pixel and the corresponding background pixel. In a step 1125, the system compares the change with a value defined by the first predetermined threshold. If the change does not exceed or is less than the value defined by the first predetermined threshold, the system loops 1130 back to step 1120 to select another pair of background pixels to compare. If the change exceeds or is greater than the value defined by the first predetermined threshold, the system increments a counter variable (step 1135). The system may iterate 1140 steps 1120-1135 in order to compare each pair of background pixels.

Upon completing the pixel-by-pixel comparison, the counter is compared with a value defined by the second predetermined threshold to determine whether the counter exceeds the second threshold (steps 1145 and 1150). If the counter exceeds the value defined by the second predetermined threshold, the system alerts the user (step 1155). If the counter is below the value defined by the second predetermined threshold, the system does not alert the user (step 1160).

In an embodiment, the thresholds are based on percentages. For example, a user may specify that an alert should be generated when there has been at least a 3 percent change in at least 1 percent of the pixels in the background. In this specific embodiment, a method includes storing first and second thresholds, comparing a background pixel in the first image with a corresponding background pixel in the second image to determine a change between the background pixel and the corresponding background pixel. The method further includes determining if the change is greater than a value defined by the first threshold and, if so, incrementing a counter. The system can iterate through these steps to compare each background pixel in the first image with each corresponding background pixel in the second image. After comparing the backgrounds on a pixel-by-pixel basis, the method includes determining whether the counter is greater than a value defined by second threshold and, if so, altering the user.

Figure 12:
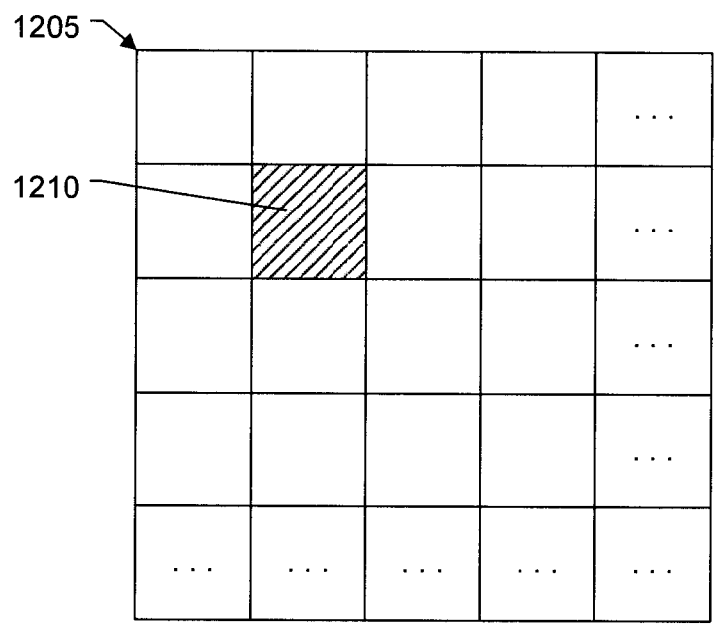
FIG. 12 shows an example of a grid of background pixels in a reference image for the first embodiment of the system.
Figure 13:
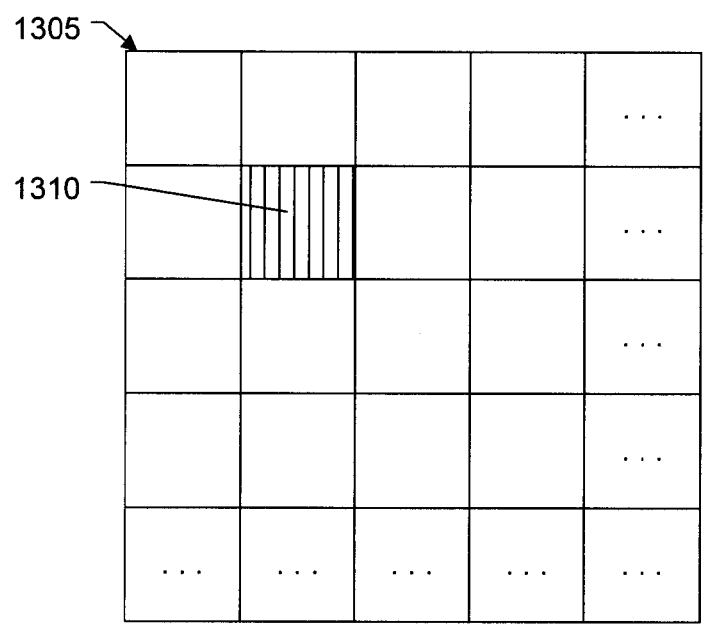
FIG. 13 shows an example of a grid of background pixels in a target image for the first embodiment of the system.

As an example, consider the grid of pixels shown in FIGS. 12-13. FIG. 12 shows an example of a first set of background pixels 1205 from a first or reference image. FIG. 13 shows an example of a second set of background pixels 1305 from a second or target image. Generally, an image includes a grid of pixels, each pixel showing a single color. For example, an 800×600 image refers to an image that is 800 pixels wide by 600 pixels high. The total number of pixels in an 800×600 image is 480,000 (e.g., 800 pixels multiplied by 600 pixels equals 480,000 pixels). It should be appreciated, however, that there can be any number of pixels. For example, cameras can produce an image having several millions of pixels. Pixels can be addressed or identified using a Cartesian or (x,y) coordinate system.

Generally, the color of a pixel is set using an RGB (red-green-blue) color model. Red, green, and blue light are combined in varying levels to produce an array of colors. Typically, the values for the red, green, and blue components range from 0 to 255. The range is based on each color component of a pixel being represented with a single byte (eight bits). Each 8 bit color component can have 256 possible values ranging from 0 to 255.

For example, a background pixel 1210 (FIG. 12) includes a first red component value, a first green component value, and a first blue component value. A corresponding background pixel 1310 (FIG. 13) includes a second red component value, a second green component value, and a second blue component value. In an embodiment, a method to determine whether a background pixel has changed includes determining a difference or percentage change between a component value of a background pixel and a corresponding component value of a corresponding background pixel, comparing the difference to a first predetermined threshold, and if the difference exceeds or is greater than the first predetermined threshold, identifying the background pixel as having changed, otherwise, not identifying the background pixel as having changed.

Below is an example that uses RGB pixel data to determine whether a background pixel should be identified as changed.

TABLE A

| Pixel | Red Component Value | Green Component Value | Blue Component Value |
|---|---|---|---|
| Background pixel 1210 | 6 | 250 | 7 |
| Corresponding background pixel 1310 | 251 | 250 | 7 |

The data in Table A above shows that background pixel 1210 (FIG. 12) has a first red component value of 6, a first green component value of 250, and a first blue component value of 7. Corresponding background pixel 1310 (FIG. 13) has a second red component value of 251, a second green component value of 250, and a second blue component value of 7.

A percentage change from the first red component value of the background pixel in the first image to the second red component value of the corresponding background pixel in the second image is 4,083 percent (i.e., 251 minus 6 divided by 6 and multiplied by 100 equals 4,083 percent). In an embodiment, the percentage change (e.g., 4,083 percent) is compared to the first predetermined threshold (e.g., 3 percent) to determine whether the change exceeds the threshold. In this case, a change in background pixel is detected because 4,083 percent is greater than 3 percent. Thus, a counter variable is incremented (step 1135-FIG. 11). In other words, in this example an individual pixel is determined to have changed if its RGB value has changed by more than 3 percent.

In an embodiment, at least a subset of background pixels from the first image is compared with at least a subset of corresponding background pixels from the second image to determine whether a change exceeds the first threshold and, if so, incrementing a counter variable. There may be a subset and corresponding subset of background pixels that are not analyzed in order to reduce the time for analysis. Analyzing RGB pixel data to determine changes in background may instead or additionally include analyzing pixel hue, saturation, and lightness (HSL data), analyzing pixel hue, saturation, and value (HSV data), or combinations of these.

In this embodiment, upon completing the pixel-by-pixel comparison of the at least a subset of background and corresponding background pixels, the counter is compared to a value defined by the second threshold. As discussed above, in this example, the user has specified that an alert should be generated when there has been at least a 3 percent change in at least 1 percent of the background pixels. One percent of the pixels translates into 4,800 pixels (i.e., 480,000 pixels multiplied by 1 percent equals 4,800 pixels). Thus, an alert will be generated if the counter exceeds 4,800 pixels. If the counter is below 4,800 pixels an alert will not be generated.

Figure 14:
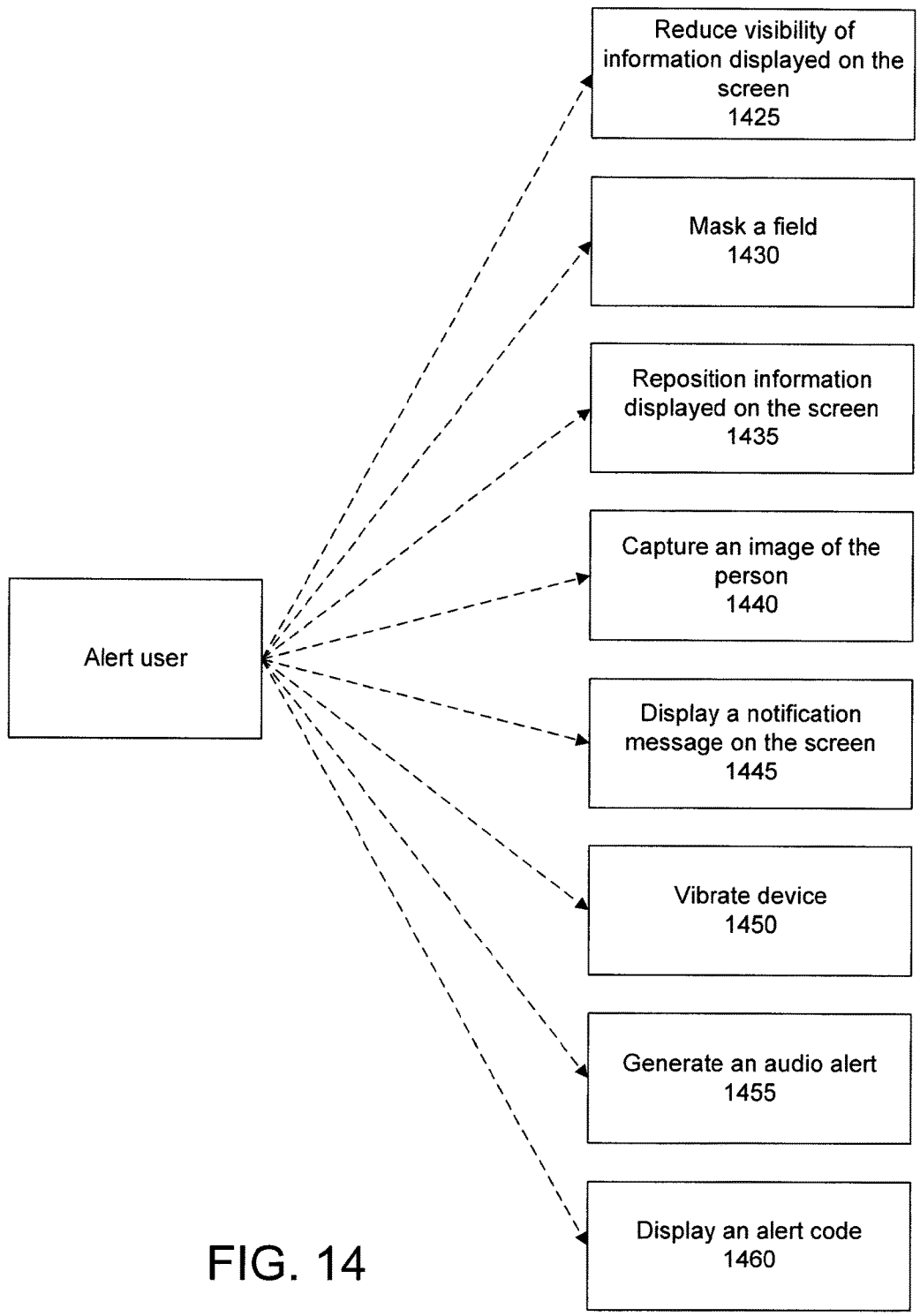
FIG. 14 shows a listing of alert types that may be generated to alert the user to a shoulder surfer.

FIG. 14 lists the various types of alerts that may be generated. In an embodiment, alerting the user includes altering the graphical user interface that is displayed on the screen. The alteration may include reducing the visibility of information displayed on the screen (1425). A graphical region may be generated that overlays, is superimposed over, or covers all or at least a portion of the information shown on the screen. For example, the information shown on the screen may include sensitive information (e.g., social security number) and non-sensitive information (e.g., restaurant menu). The system can position the graphical region over the sensitive information, but leave the non-sensitive information exposed or not covered. This allows the user to continue viewing the non-sensitive information, but protects the sensitive information from the prying eyes of a potential shoulder surfer. Whether or not the information is sensitive or non-sensitive can be determined by field attributes or identifiers as discussed in this patent application.

The graphical region may be opaque (e.g., a solid color, solid black, solid white, or solid red) such that information below the graphical region is not visible. Alternatively, the graphical region may be translucent so that information below the graphical region cannot be seen clearly or is only partially visible or legible.

Typically, a shoulder surfer will not be directly in front of and facing the device screen. The shoulder surfer may be at an angle relative to the device screen. An angle between the shoulder surfer and an axis perpendicular to the device screen may be greater than an angle between the user and the axis. A distance between the shoulder surfer and the device screen may be greater than a distance between the user and the device screen. That is, the distance between the user and the device screen may be less than the distance between the shoulder surfer and the device screen.

Because of the differences in distances, angles, or both a translucent overlay may be sufficient to allow the user to still recognize the information below the translucent overlay, while making the information illegible (e.g., blurry) to the potential shoulder surfer. Thus, the user can continue to view the information, but the information will not be legible to the shoulder surfer.

In another embodiment, the system can mask a field such as a field label, input field, or both (step 1430). In this embodiment, a method includes permitting or displaying values input by a user into an input field, determining that backgrounds of the first (or reference) and second (or target) images have changed, and after the determining, masking the input values (e.g., replacing the displayed input values with asterisks). A first state of a graphical user interface shown on the screen may display values input by a user into an input field. After determining that the background of the images have changed, the graphical user interface may be altered so that a second state of the graphical user interface is displayed, where in the second state, the input values are masked.

In another embodiment, the system can reposition information displayed on device screen (1435). In this embodiment, upon determining that the background has changed, the information may be moved from a first location (or original location) on the device screen to a second location (or new location) on the device screen, different from the first location. The second location can be a location where it will be more difficult than the first location for the potential shoulder surfer to watch the device screen than the first location. The second location can be a location where it is easier than the first location for the user to cover the screen.

The first location may be a center of the screen, and the second location may be a corner of the screen, a bottom of the screen, a top of the screen, or combinations of these (e.g., a bottom corner of the screen or top corner of the screen). The first location may be a side of the screen (e.g., left-hand side) and the second location may be a different side of the screen (e.g., right-hand side). In an embodiment, a first distance between an edge of the screen and the information in the first location is different than a second distance between the edge of the screen and the information in the second location. The first distance may be greater than the second distance. That is, the second distance may be less than the first distance. The first distance may be less than the second distance. That is, the second distance may be greater than the first distance.

Determining which side of the device screen the information should be moved to can depend on the position of the change in background relative to the device screen. In an embodiment, the information is repositioned so that it is further away from the change. For example, if the change in background is to the left of the screen and the information is being displayed in a center of the screen, the information may be moved to a right-hand side of the screen and away from the change. Moving the information away from the change can increase the distance between the displayed information and the background change (e.g., shoulder surfer appearing in background) and make it more difficult to see the information.

In another embodiment, the system can capture an image of the change (1440) (e.g., shoulder surfer appearing in background). The captured image can then be displayed on the device screen. The shoulder surfer, upon seeing their face displayed on the device screen, will realize that they are under surveillance and have been caught spying on the user's information. This can serve as a deterrent to discourage the shoulder surfer from further spying.

In another embodiment, the system may display a notification message on the screen (1445). The notification message may include text to indicate to the shoulder surfer that the user is aware of the spying. It should be appreciated that the system can implement a combination of operations or actions to help keep the user's information private (e.g., capture image of shoulder surfer and display notification).

In another embodiment, the system may provide a silent or coded alert. Such an alert can inform the user that there is a potential shoulder surfer watching the screen, but not alert the shoulder surfer that the user is aware of their presence. For example, the system may cause the mobile device to vibrate (1450), generate an audio alert (1455), display decoy information or a code, e.g., "Blue Horseshoe Loves Anacott Steel" (1460), or combinations of these. This feature helps the user to avoid a potentially awkward and perhaps even confrontational situation. The system may alert the user through a vibration, audio alert or both and without altering the graphical user interface shown on the device screen. The user, upon receiving the alert, can then take an appropriate course of action. For example, the user may move to a different seat on the bus, exit the application showing the sensitive information, stop using the device, and so forth.

The type of alert provided by the system can be user-configurable. For example, one user may select an alert type that captures an image of the background change (e.g., shoulder surfer appearing in background) and displays the image on the screen for both the user and shoulder surfer to see (e.g., 1440). Alternatively, another user may select an alert type that provides a silent alert (e.g., 1450). It should be appreciated that an alert may be a visual alert (e.g., display message, flicker screen, darken screen, blank out screen, or apply graphical overlay), audio alert (e.g., beeping, or siren), or both.

Figure 15:
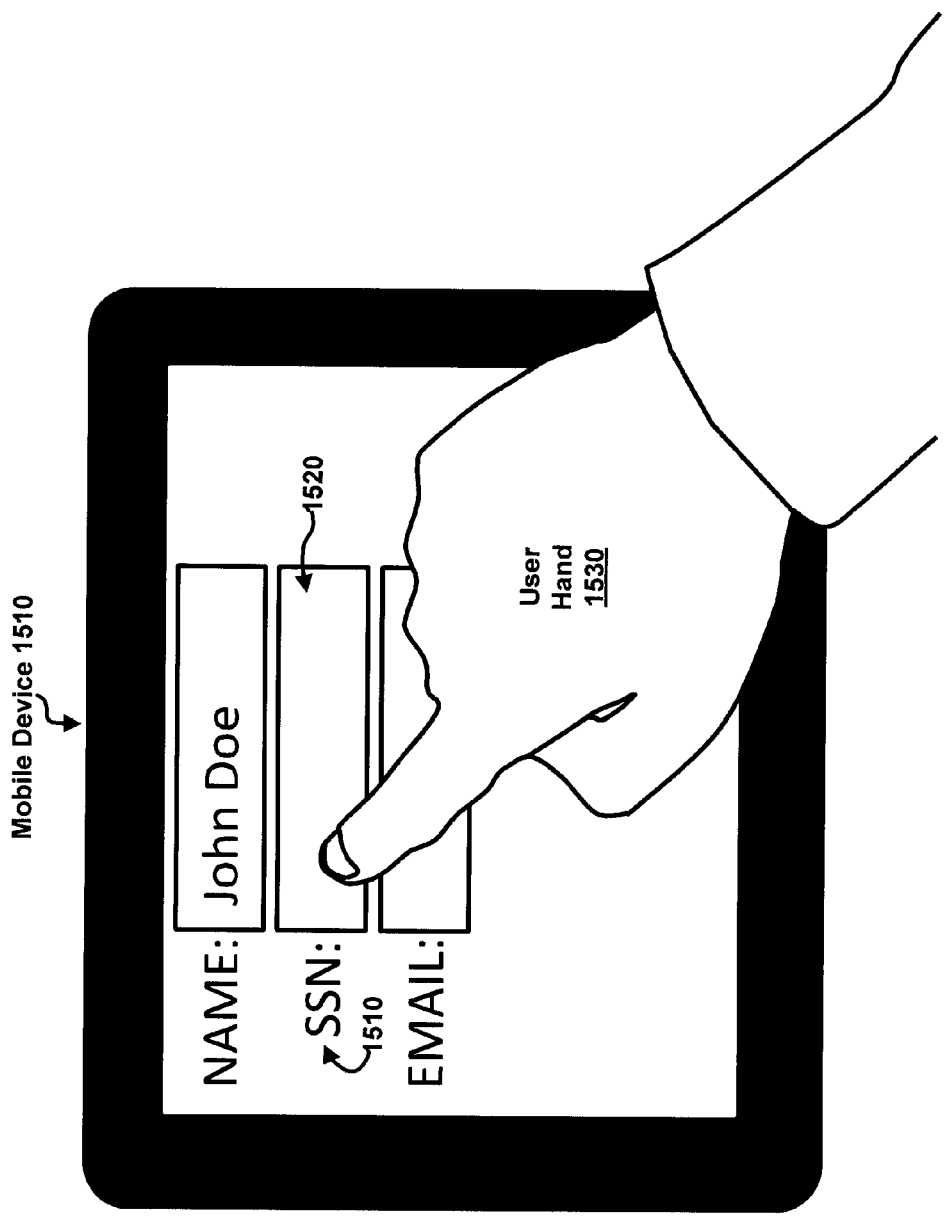
FIG. 15 shows an example of information on an electronic screen that may be subject to shoulder surfing.
Figure 16:
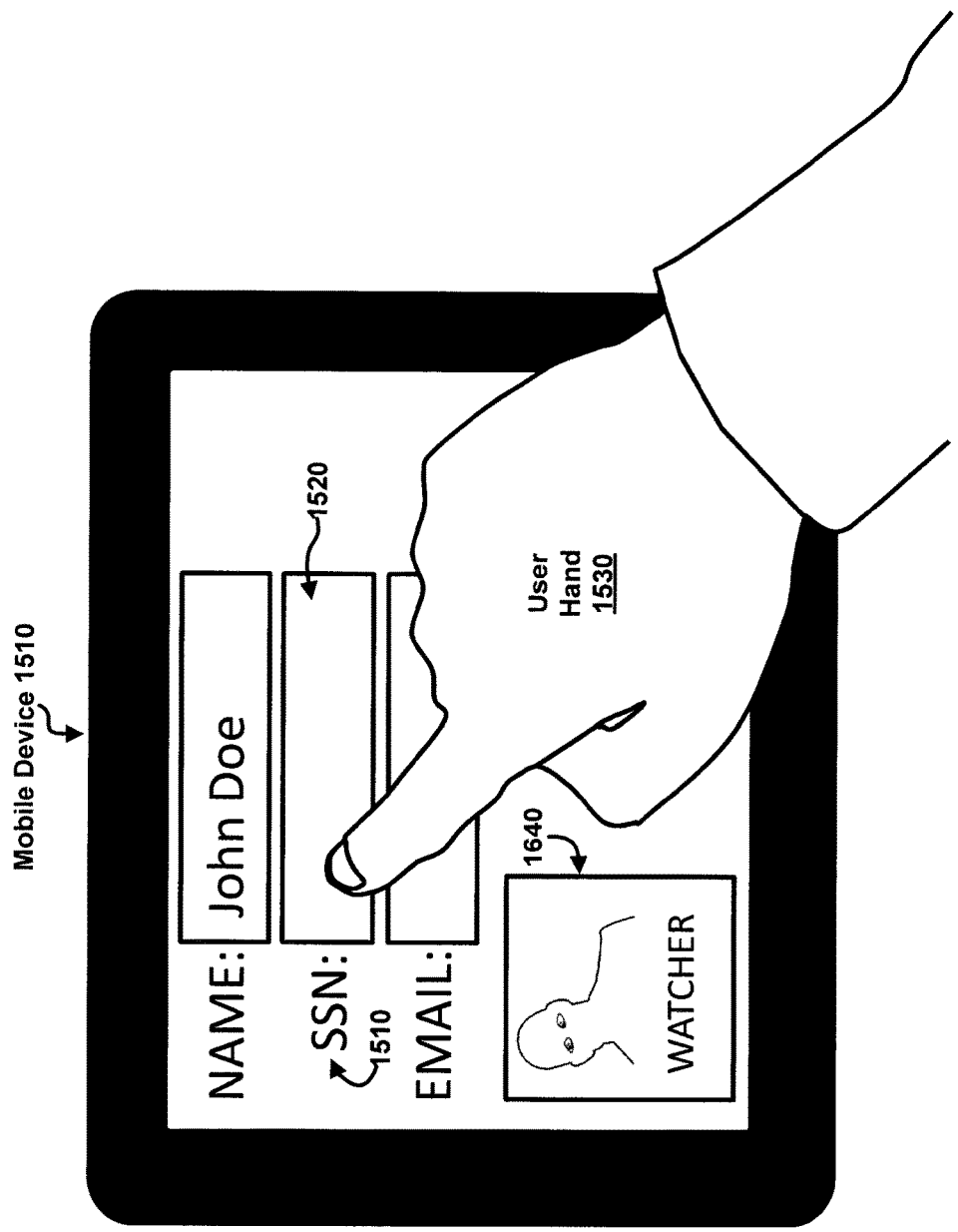
FIG. 16 shows an example of a user inputting information on the electronic screen.

FIGS. 15-22 show some examples of scenarios in which the system can offer protection from shoulder surfing based upon detecting a change in background. In another embodiment the mobile device can provide some information about the detection of or possible presence of a shoulder surfer to the user. In FIG. 15 the user is interacting with a user interface displayed upon the display screen of the mobile device 1510. The user is preparing with the user's hand 1530 to fill in a piece of sensitive, private, personal identifying information into the field 1520 that is labeled SSN 1510 (where SSN denotes, in this example, Social Security Number).

When the mobile device 1510 detects a change in background indicating a possible shoulder surfer, a watcher 1640 (FIG. 16), the mobile device can display an image (a snapshot or series of snapshots or a live video) taken from the camera upon the display screen. This can inform the user that there is a potential watcher or shoulder surfer in view of the information on the display screen.

Figure 17:
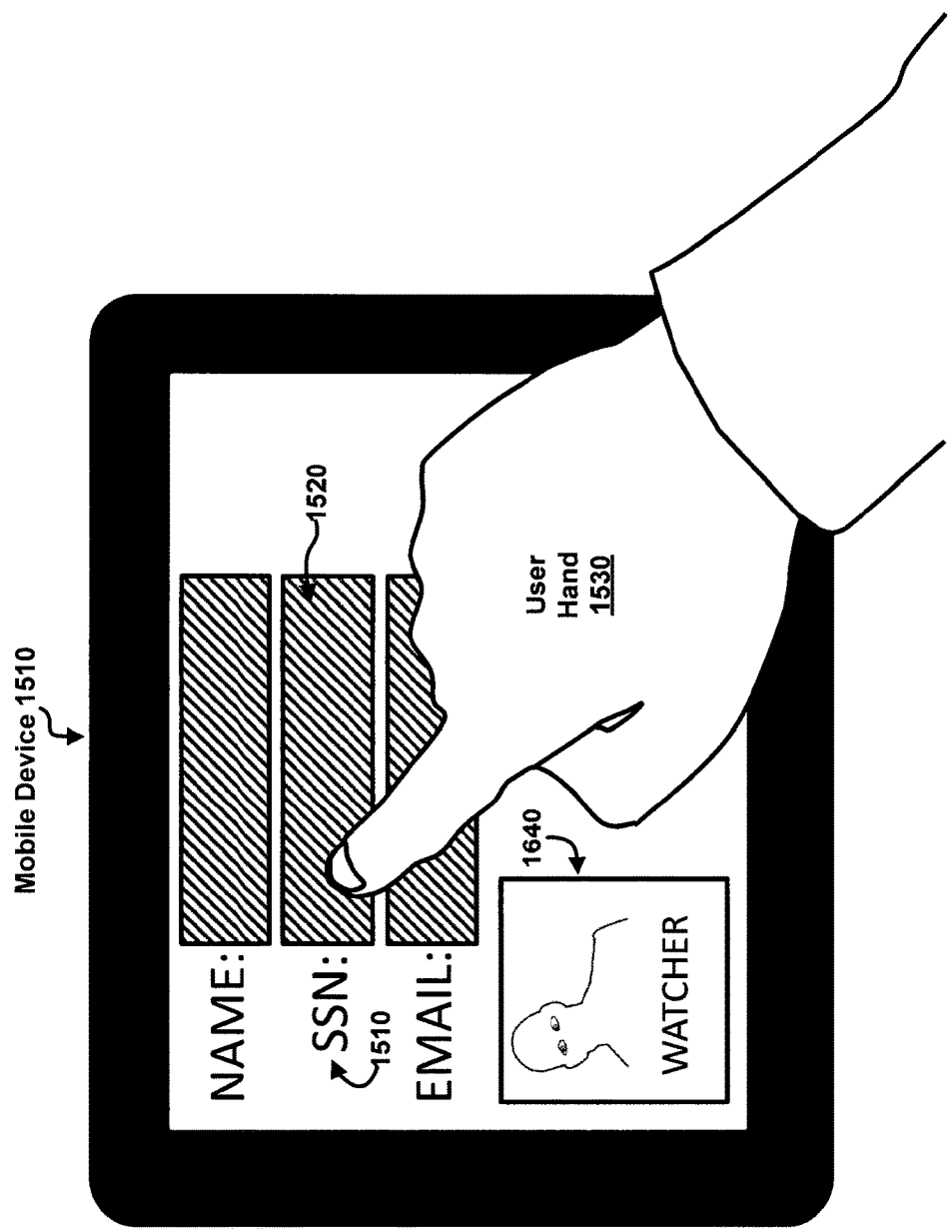
FIG. 17 shows an example of the information being hidden from the shoulder surfer.

As shown in FIG. 17, upon detecting a change in background and thus the presence of a possible watcher, the mobile device can obscure the content of some or all fields containing information previously entered by the user or which are of a sensitive nature.

Figure 18:
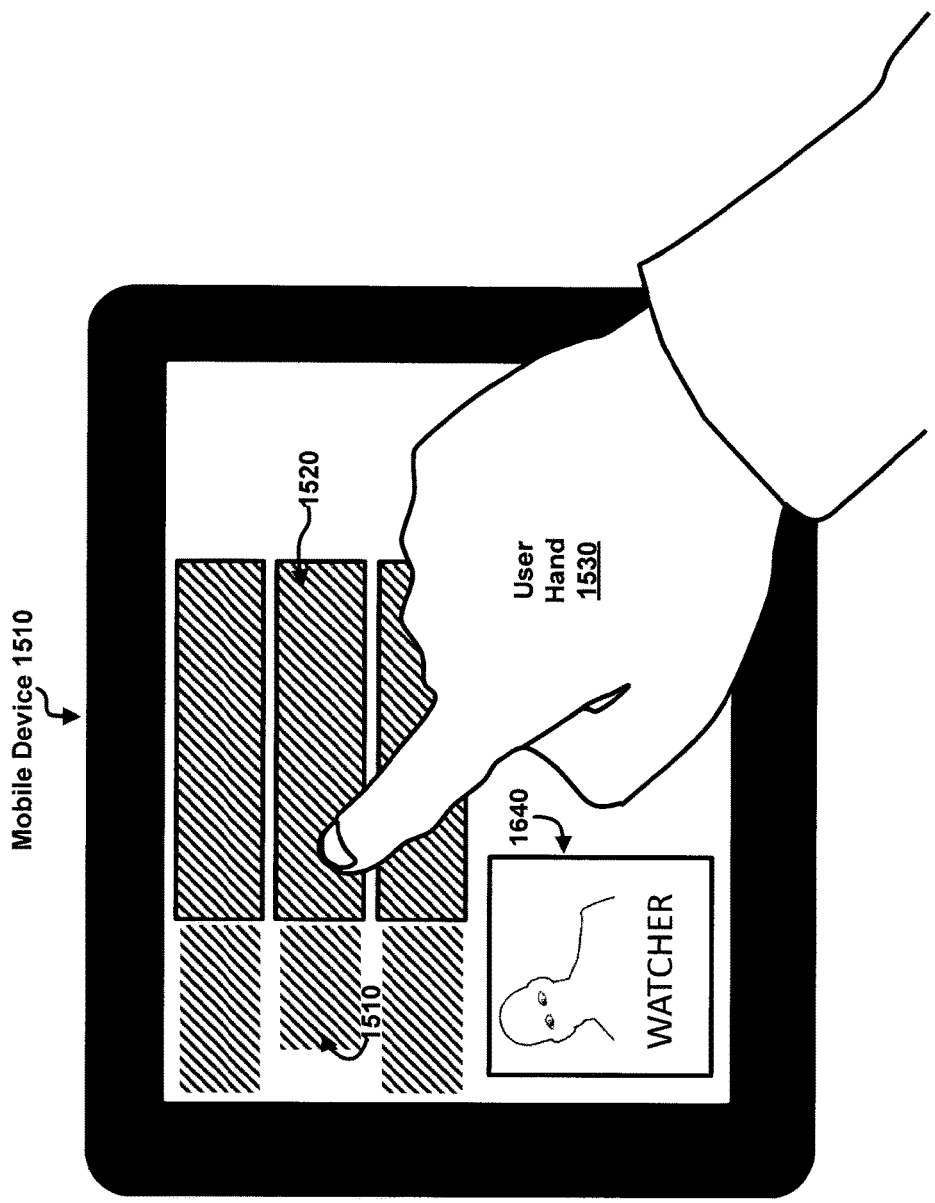
FIG. 18 shows another example of the information being hidden from the shoulder surfer.

As shown in FIG. 18, optionally, the mobile device can also obscure the labels of such fields, or other text which may reveal sensitive or private information about the user's activity. Information and fields that are not sensitive may remain unobscured, and the user can choose to continue interaction with those parts of the display.

Figure 19:
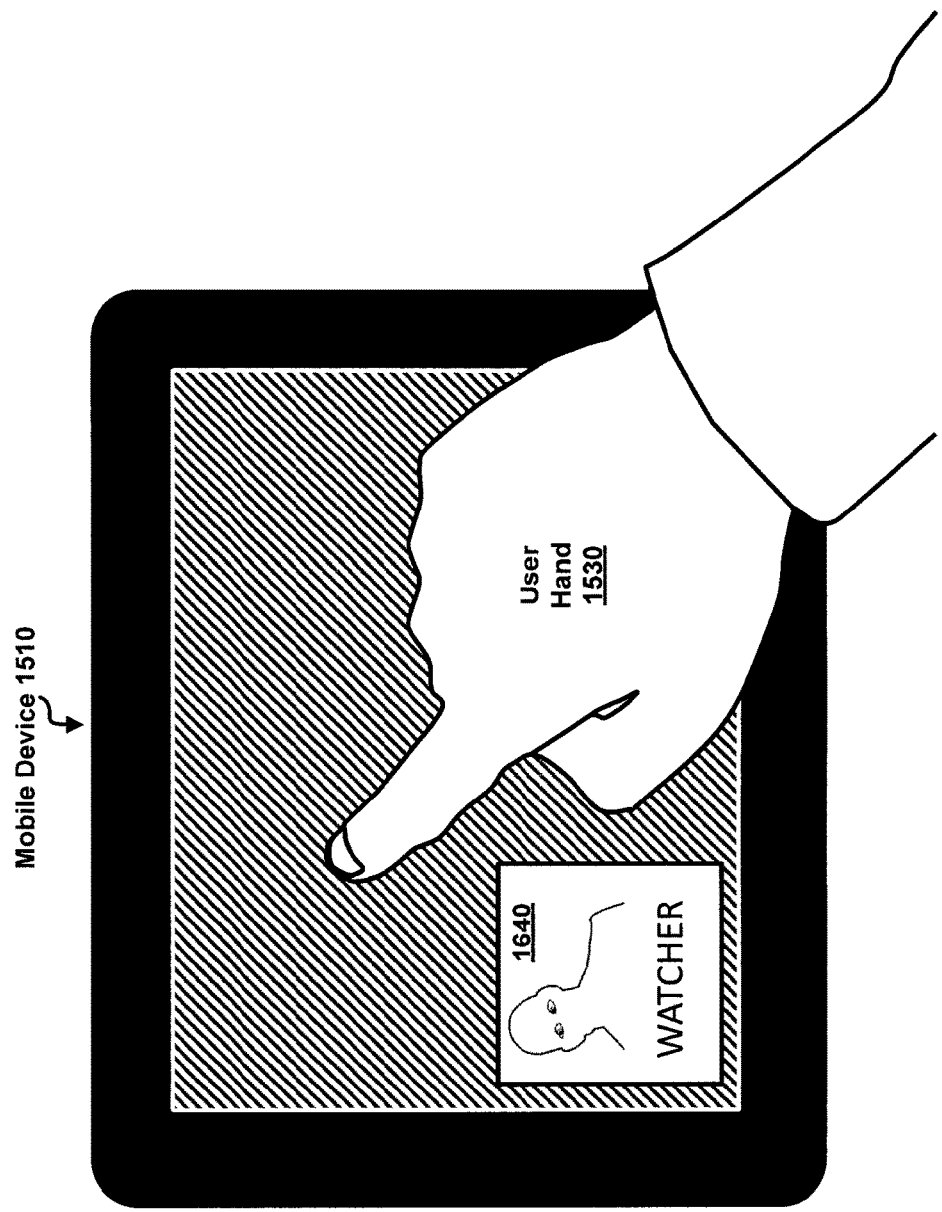
FIG. 19 shows another example of the information being hidden from the shoulder surfer.

In an embodiment as shown in FIG. 19 all information on the display screen can be obscured.

Figure 20:
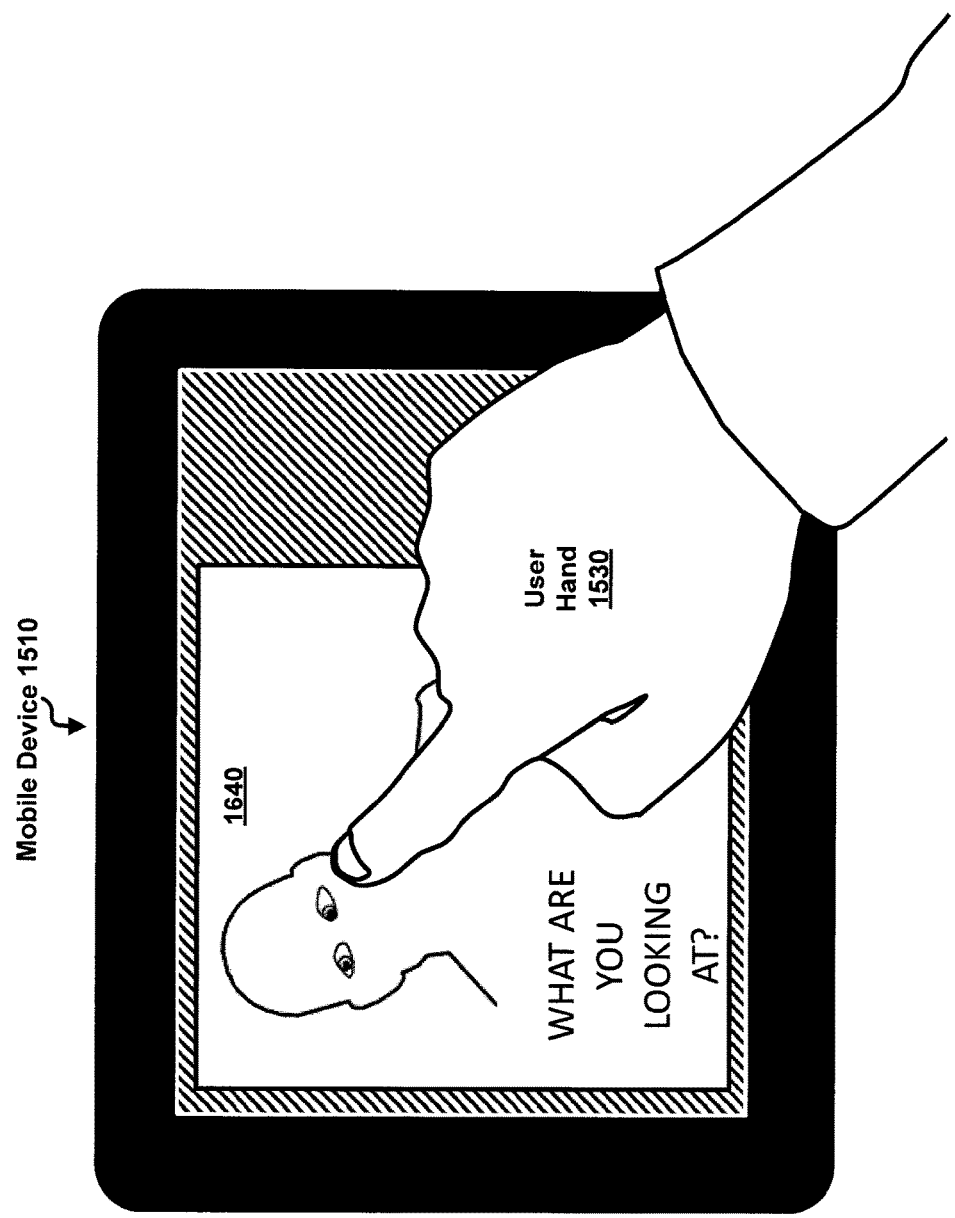
FIG. 20 shows an example of the shoulder surfer's image being captured and displayed on the device screen.

In another embodiment, as shown in FIG. 20, not only is part or all of the screen obscured, but a message is displayed with a large picture of the background change (e.g., watcher or shoulder surfer), to deter the watcher from further shoulder surfing.

Figure 21:
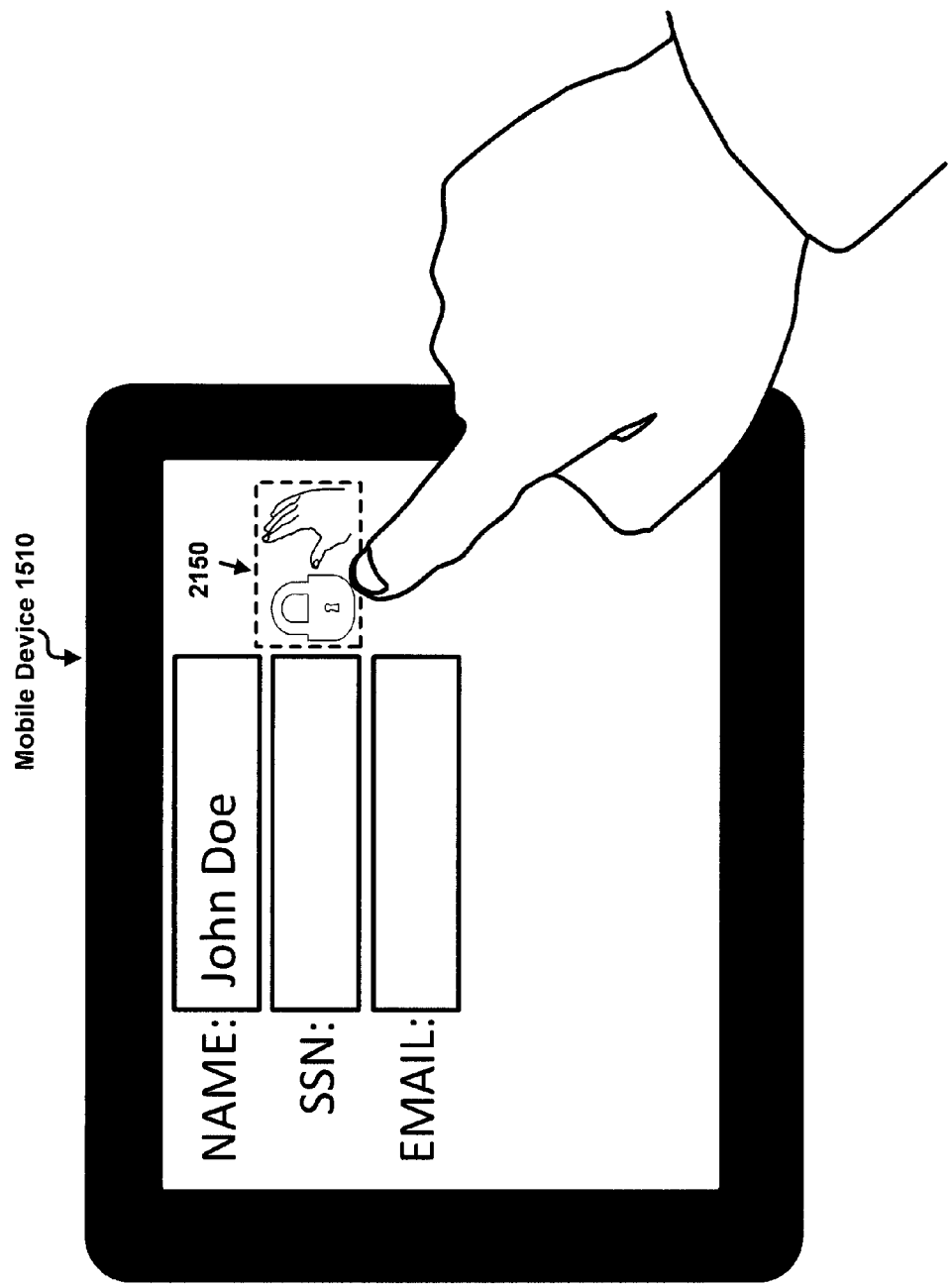
FIG. 21 shows an example of a graphical icon that can be selected to reposition information shown on the device screen.

Referring now to FIG. 21, in a different embodiment the user may wish to perform data entry into a field of private or sensitive or personal identifying information. In this embodiment the mobile device provides a mechanism for the user to perform said data entry in a special location on the mobile device, said location being positioned so as to allow the user to shield the data entry with one hand while entering data with the other. The user taps or clicks or presses the icon 2150 that indicates hand shielded data entry.

Figure 22:
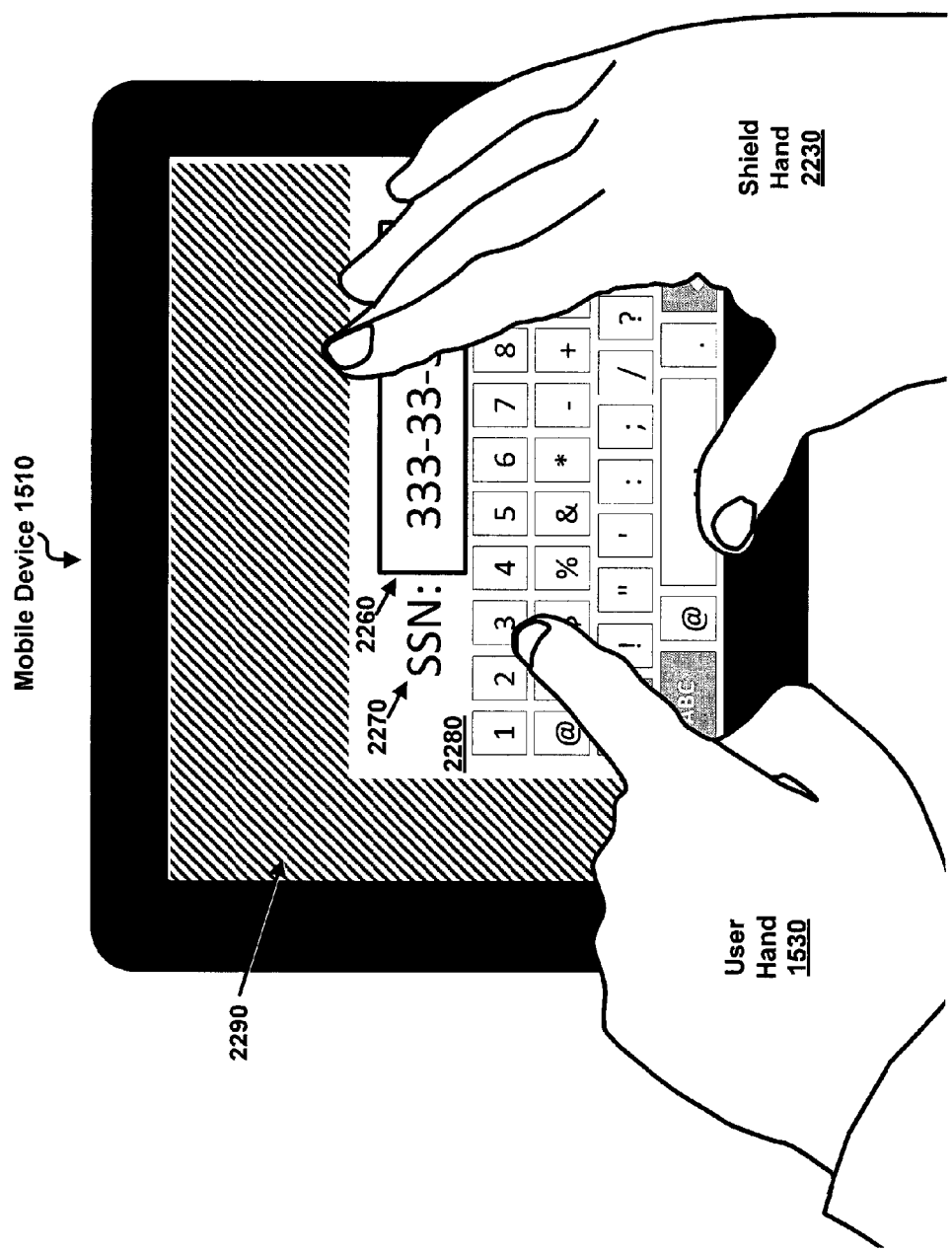
FIG. 22 shows an example of the user using their hand to shield information that has been repositioned to a different area of the device screen.

FIG. 22 shows a resultant display 2290 upon the user activating shielded hand data entry. The user enters data with the user hand 1530 upon the keyboard 2280 displayed in the lower portion of the screen. The shield hand 2230 can be used to shield the screen from a watcher so that it is difficult or impossible to see the field label 2270, the field contents 2260, or both. Upon completing data entry for the sensitive field, the user can choose to continue to the next data entry field or to return the display to the normal unshielded version.

In several of the operations previously described the device identified some information as being potentially private or sensitive or representing personal identifying information. There are several ways in which this can be accomplished.

The information can be recognized by format or content as information that may need protection. E.g., the device may know the format of a social security number (999-99-9999) and choose to recognize that format as potentially sensitive.

The information can be recognized by the label or adjacent or surrounding text displayed on the screen; e.g., the label SSN can be recognized as labeling information that may need protection.

The information can be recognized by internal identifiers or attributes used to render the display. E.g., if this portion of the display is being rendered using HTML, then in the following:

<INPUT ID="SSN">

The attribute ID having a value "SSN" can be used to recognize that this input field may have information that needs protection.

Similarly,

<INPUT TITLE="Social Security Number">

In HTML as used today there is a TYPE attribute for an INPUT field. One of the values of TYPE is PASSWORD. When TYPE="PASSWORD" on an INPUT field, the display of individual characters is suppressed, and other tokens are displayed, such as asterisks or small filled-in circles.

A new TYPE attribute value of PRIVATE or SENSITIVE or PII could be used to designate the INPUT field as needing the type of shoulder surfing protection described herein.

Alternatively a new attribute such as PRIVATE could be employed to mark this information as needing protection, as in:

<INPUT PRIVATE="YES">

Any such input field or label or text or other visual element could be so marked. The presence on screen a visual rendering of any elements so marked would be a trigger for shoulder surfing protection to be active. Any elements so marked would be protected by blanking or obscuring upon recognition of a watcher. Input to any elements so marked can be provided with a hand shield icon and action to perform data entry in a particular location of the screen where the user can protect the information. There can be left or right handed versions of the location, or it can be a matter of user choice.

As discussed above, a specific embodiment of the system detects potential shoulder surfers by monitoring for changes in background. That is, the mobile user satisfies themselves that the environment is free of shoulder surfers and begins work. The system takes note of the background via the camera. The background is the part of the image that is not user's face or hands or other body parts. As long as background stays substantially the same user is ok. If the system detects any change in background then privacy measures are initiated.

The system can continuously monitor an area in which the user is working by repeatedly comparing a reference background image with multiple target background images acquired via live video stream or still photographs acquired at periodic intervals. If a new object discovered in a first target background image is not found in a second background image taken after the first background image, then the system can restore normal visibility of the screen (e.g., undo a blanking or obscuring operation).

While the system is active, the system can detect changes in the user's geographic location. For example, the user may move from a first geographic location (e.g., coffee shop) to a new or second geographic location (e.g., library), different from the first geographic location. Upon detecting the change in geographic location (and thus change in background), the system can acquire a new reference image of the new geographic location in order to begin monitoring at the new geographic location. The system can delete automatically, i.e., without user intervention, the old reference image associated with the first geographic location. Deleting the old reference image helps to free up or increase the amount of storage space available on the device.

Figure 23:
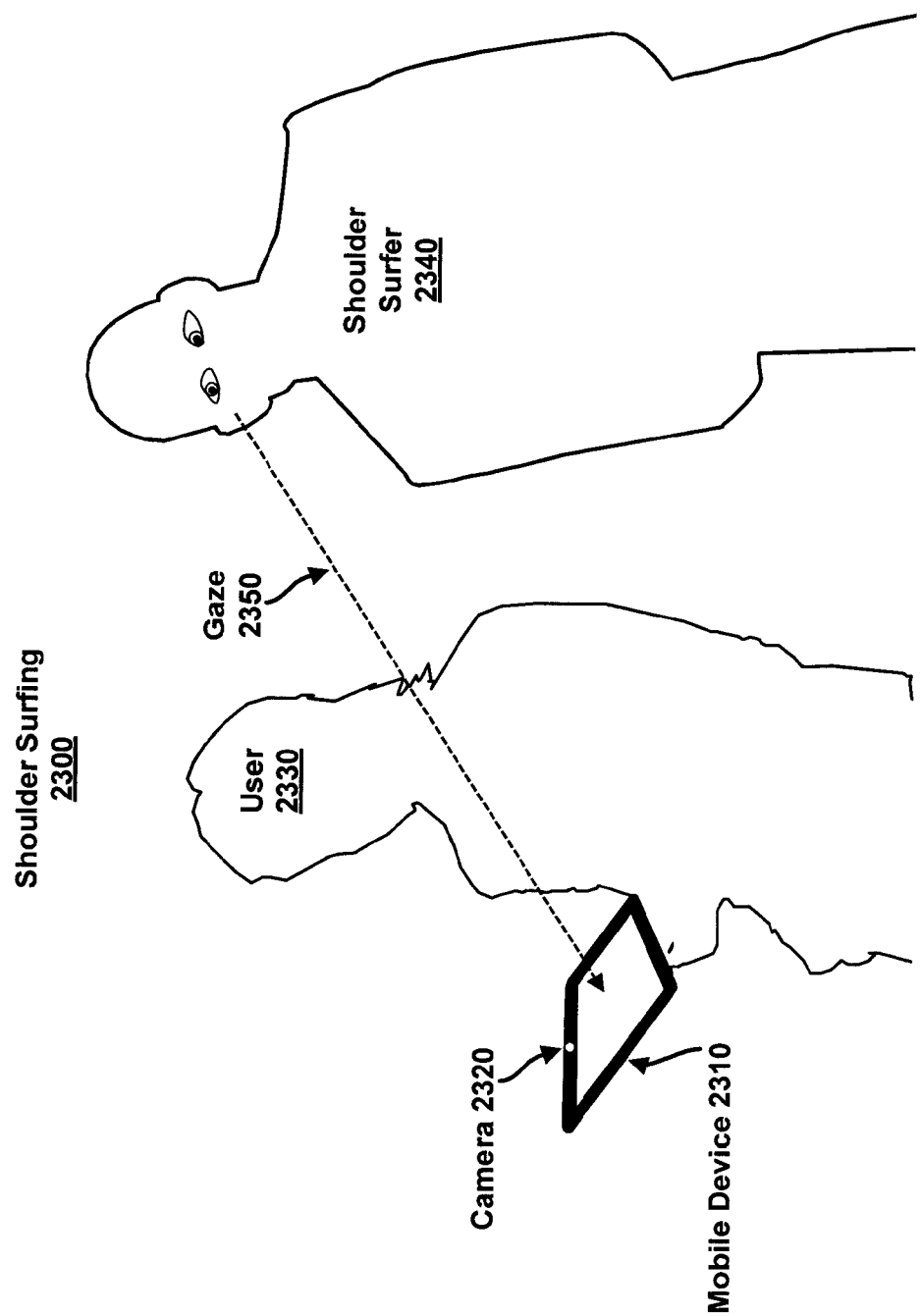
FIG. 23 shows an example of shoulder surfing in a second embodiment of a system to prevent shoulder surfing.

Another specific embodiment of the system uses gaze tracking to detect shoulder surfers. For example, consider the scenario shown in FIG. 23. As discussed above, shoulder surfing 2300 is a security and privacy problem. When a person (user 2330) is using a device 2310, such as a smartphone or a tablet or a personal computer, information is displayed on the device's screen. This information can include private or sensitive information, or Personal Identifying Information (PII). When a person is concentrating on using a device, that person's gaze is directed towards the device screen; the person is not generally aware of other people in the environment, where those people may be looking, especially people that are to the side or behind the person using the device. It is possible for such a person, the shoulder surfer 2340, to observe the device's display screen and the information that is displayed upon it. This act is commonly referred to as shoulder surfing.

As discussed above, a device 2310 may have a front-facing camera 2320, which faces the user 2330. Such a camera is capable of observing scenes that are in front of the device. The field of view of such a camera may be as much as 180 degrees, permitting a view of everything that is front of the camera and thus the device. The camera 2320 can observe any person who has a line of sight that allows that person to view the device's display screen; if the person can see the device, the device can see the person. In this specific embodiment of the system, the system can include techniques for the identification of face objects in an image, and in particular, to observe the geometry and orientation of the face in such an image, and to identify the location of the eye orbits, and position of the pupils within the eye orbit. This information allows for determining the direction of gaze 2350 of a shoulder surfer 2340. The system can include techniques to estimate gaze direction.

Figure 24:
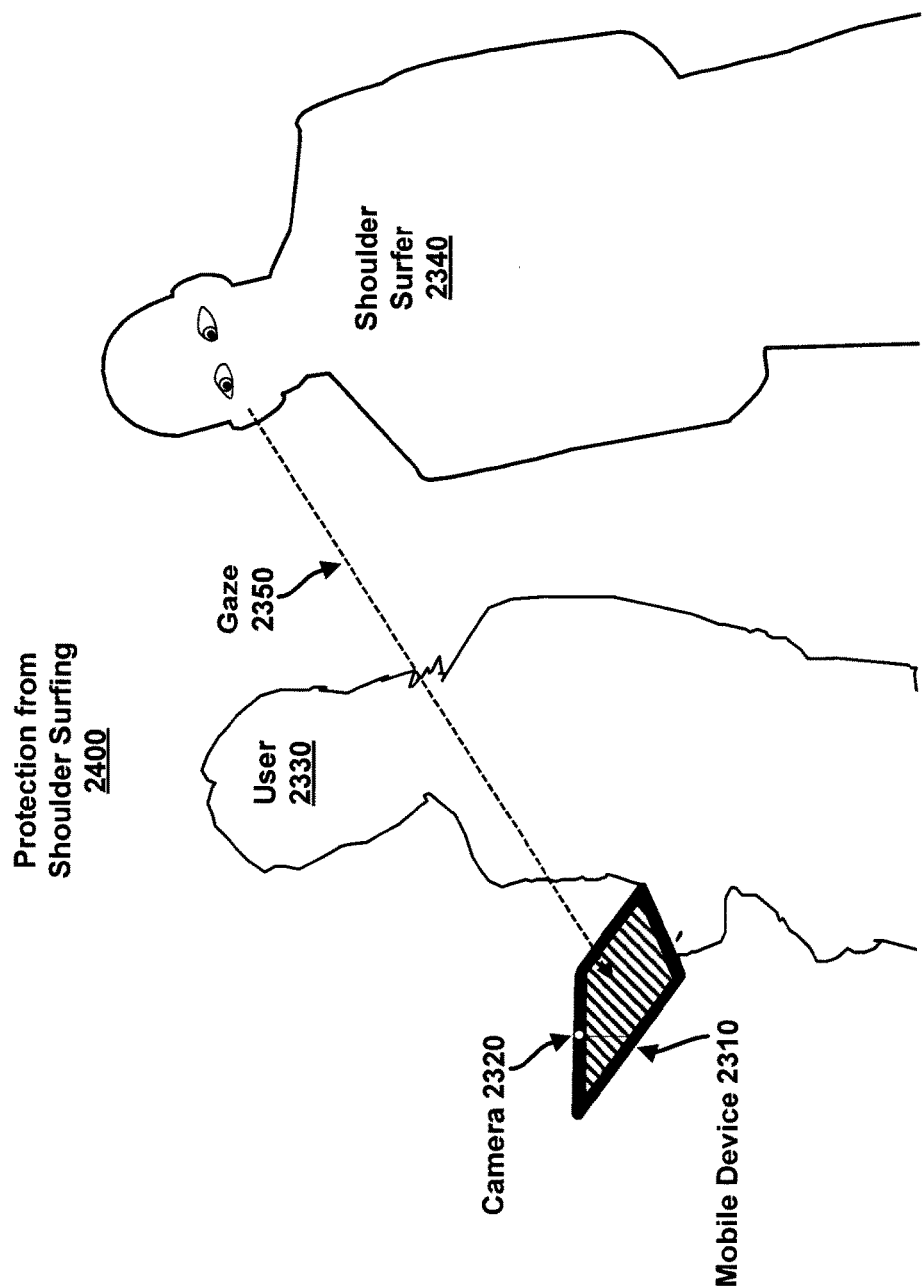
FIG. 24 shows an example of shoulder surfing being prevented in the second embodiment of the system.

In this specific embodiment the mobile device 2310 uses the camera 2320 to recognize that there is a shoulder surfer 2340, a person who is not the user 2330, whose gaze 2350 is directed at the display screen of the mobile device. Upon recognition of a gaze directed at the display screen the mobile device can take a responsive action, such as blanking out the display screen or obscuring some or all of the information on the display screen, as shown in FIG. 24. There may be a configurable amount of time from the recognition event until the responsive action is taken. Upon detection that the gaze 2350 is no longer directed at the display screen the mobile device can undo the responsive action, restoring normal operation of the display screen. Alternatively, the user 2330 can choose to manually override the responsive action, restoring the normal operation of the display screen.

In an embodiment the user 2330 can indicate to the mobile device that this particular shoulder surfer 2340 should be ignored as a shoulder surfing threat, for a configurable amount of time, or forever after. If so, then subsequent detections that involve a shoulder surfer 2340 who has been marked by the user to be ignored will not trigger a responsive action.

In a different embodiment the mobile device 2310 can take a preemptive action to avoid shoulder surfing. In the same way that the mobile device 2310 can detect the gaze 2350 of a shoulder surfer 2340, the mobile device can detect the gaze direction of the user 2330. If the gaze direction of the user 2330 is no longer directed towards the display screen of the mobile device, the device can blank out or obscure part or all of the display screen contents. Upon the user 2330 returning the user's gaze to the display screen, the device can undo the blanking or obscuring operation, restoring the display screen to normal operation. There can be a configurable amount of time between the detection of the loss of gaze of the user 2330 and the taking of a blanking or obscuring operation.

Figure 25:
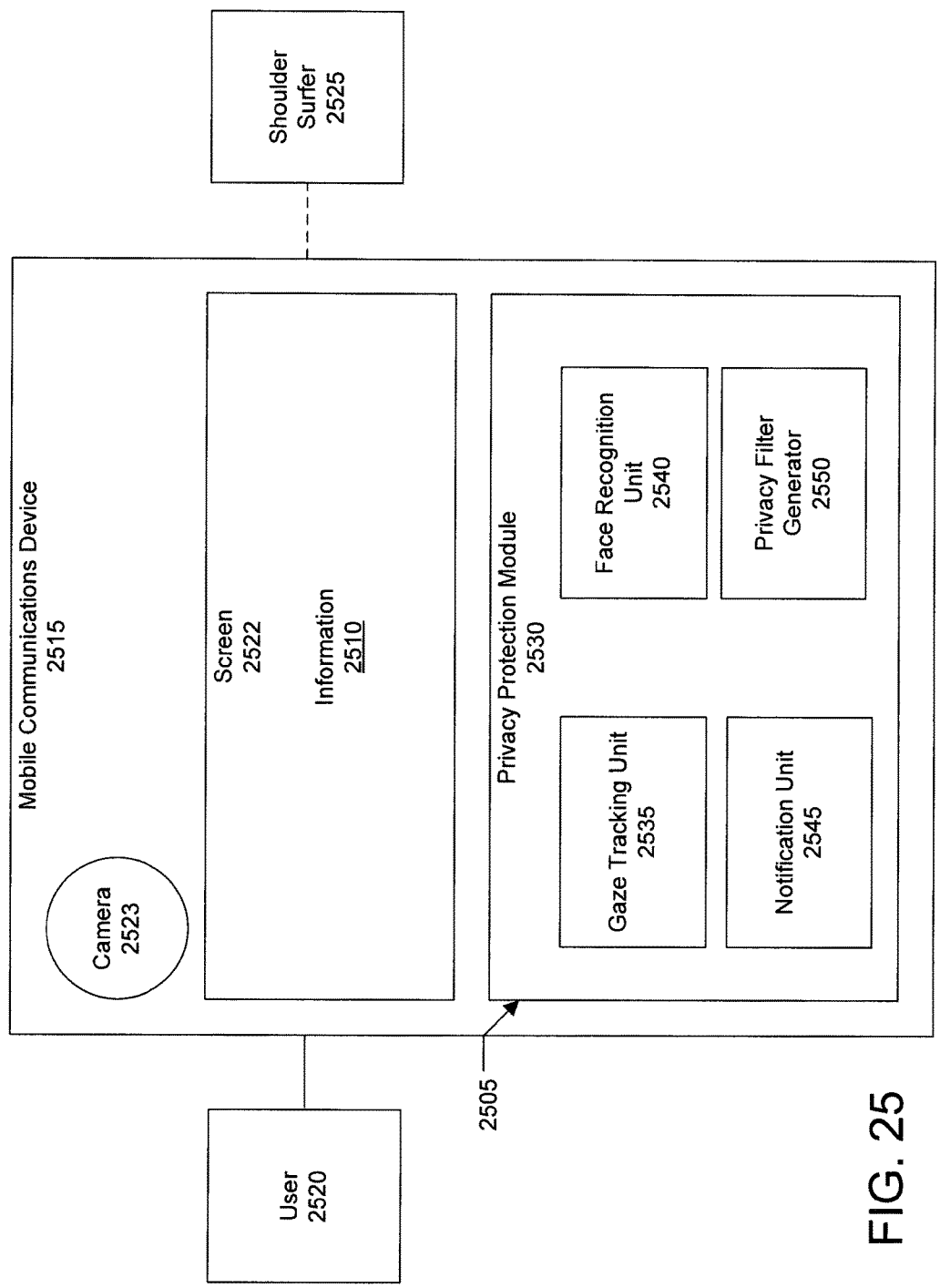
FIG. 25 shows a block diagram of the second embodiment of a system that uses gaze tracking to prevent shoulder surfing.

FIG. 25 shows a specific embodiment of a system 2505 that uses gaze tracking to detect a shoulder surfer 2525. This system includes a privacy protection module 2530 that includes a gaze tracking unit 2535, a face recognition unit 2540, a notification unit 2545, and a privacy filter generator 2550.

The gaze tracking unit tracks the gaze direction of the person (e.g., shoulder surfer), the user, or both. Any non-invasive technique may be used for gaze tracking. One technique includes an optical method for measuring eye motion. Light, typically infrared, is reflected from the eye and sensed by a video camera or some other designed optical sensor. The information is then analyzed to extract eye rotation from changes in reflections. The corneal reflection (the first Purkinje image) and the center of the pupil can be used as features to track over time.

The system may incorporate an eye tracker that uses reflections from the front of the cornea and the back of the lens as features to track. Another technique includes imaging features from inside the eye, such as the retinal blood vessels, and following these features as the eye rotates. An eye-tracker of the system may use the center of the pupil and infrared/near-infrared non-collimated light to create corneal reflections (CR). The vector between the pupil center and the corneal reflections can be used to compute the point of regard on surface or the gaze direction.

Other examples of eye tracking techniques that the system may incorporate include bright pupil and dark pupil. Their difference is based on the location of the illumination source with respect to the optics. If the illumination is coaxial with the optical path, then the eye acts as a retroreflector as the light reflects off the retina creating a bright pupil effect similar to red eye. If the illumination source is offset from the optical path, then the pupil appears dark because the retroreflection from the retina is directed away from the camera.

Bright pupil tracking creates greater iris/pupil contrast allowing for more robust eye tracking with all iris pigmentation and greatly reduces interference caused by eyelashes and other obscuring features. It also allows for tracking in lighting conditions ranging from total darkness to very bright. Bright pupil techniques, however, are generally not effective for tracking outdoors as extraneous infrared (IR) sources interfere with monitoring.

Eye movement is typically divided into fixations and saccades, when the eye gaze pauses in a certain position, and when it moves to another position, respectively. The resulting series of fixations and saccades is called a scanpath. Most information from the eye is made available during a fixation, but not during a saccade. The central one or two degrees of the visual angle (the fovea) provide the bulk of visual information; generally, the input from larger eccentricities (the periphery) is less informative. Thus, the locations of fixations along a scanpath show what information loci on the stimulus were processed during an eye tracking session. On average, fixations last for around 200 milliseconds (ms) during the reading of linguistic text, and 350 ms during the viewing of a scene. Preparing a saccade towards a new goal takes around 200 ms.

Selecting a particular eye tracking technique may be based on criteria or factors such as cost, desired sensitivity, expected power drain, expected application, and others. For example, a technique providing very sensitive gaze tracking may require more computing resources (e.g., battery power, memory, storage, or processing power) than a less sensitive technique. Mobile devices such as smartphones, tablet computers, and other portable electronic devices typically have less computing resources than, for example, desktops or servers. It is desirable that a mobile device be relatively light and compact. These features allow the device to be easily held and carried such as in a pocket, purse, backpack, or briefcase. Thus, in some cases, it will be desirable to select a less sensitive gaze tracking technique than a more sensitive gaze tracking technique if, for example, the less sensitive gaze tracking technique consumes less resource, allows for a more compact mobile device, is less expensive, or combinations of these.

The face recognition unit is responsible for automatically identifying a person from a digital image or a video frame provided by the mobile device camera. Any non-invasive technique may be used. The face recognition unit may compare selected facial features from the image and a facial database. The facial database may be stored at the mobile device, server, or both.

Storing the facial database at the mobile device can allow a facial recognition to be made at the mobile device without need to contact the server. The user will not accrue network usage charges from their wireless carrier. Making a determination at the mobile device can be advantageous in situations where there is no network connectivity. Alternatively, storing the facial database at the server helps to reduce the amount of storage required at the mobile device. Further, a server typically has more computing power than a mobile device. Performing facial recognition at the server can provide for more accurate results as compared to facial recognition at the mobile device.

Whether the facial database is stored at the mobile device, server, or both can depend on factors such as computing resources available on the mobile device, desired accuracy, application of the system, and others. In an embodiment, components of the privacy protection module reside on the mobile device. In another embodiment, the components are distributed between the mobile device and the server.

The face recognition unit may incorporate a facial recognition algorithm that identifies facial features by extracting landmarks, or features, from an image of the subject's face. For example, an algorithm may analyze the relative position, size, and/or shape of the eyes, nose, cheekbones, and jaw. These features can then be used to search for other images with matching features.

There can be an algorithm that normalizes a gallery of face images and then compresses the face data, only saving the data in the image that is useful for face detection. A probe image may then be compared with the face data. Template matching techniques can be applied to a set of salient facial features, providing a compressed face representation.

The face recognition unit may include a geometric recognition algorithm. This algorithm looks at distinguishing features. Instead or additionally, a photometric recognition algorithm may be used. The algorithm provides a statistical approach that distills an image into values and compares the values with templates to eliminate variances. Other examples of recognition algorithms that may instead or additionally be used include principal component analysis using eigenfaces, linear discriminate analysis, elastic bunch graph matching using the Fisherface algorithm, the Hidden Markov model, and the neuronal motivated dynamic link matching.

Another example of a facial recognition technique that may be used includes three-dimensional face recognition. This technique uses 3D sensors to capture information about the shape of a face. This information is then used to identify distinctive features on the surface of a face, such as the contour of the eye sockets, nose, and chin. One advantage of 3D facial recognition is that it is not affected by changes in lighting like other techniques. It can also identify a face from a range of viewing angles, including a profile view. Three-dimensional data points from a face improve the precision of facial recognition.

Another example of a facial recognition technique that may be used includes skin texture analysis. This technique uses the visual details of the skin to turn the unique lines, patterns, and spots apparent in a person's skin into a mathematical space. The facial recognition unit may include a single recognition technique or a combination of recognition techniques. For example, skin texture analysis may be used in combination with other recognition techniques to provide accurate recognition.

The criteria for selecting a particular facial recognition technique is similar to the criteria discussed above for selecting a particular gaze tracking technique. That is, such criteria can include cost, desired sensitivity, expected power drain, expected application of the system, and others.

Figure 26:
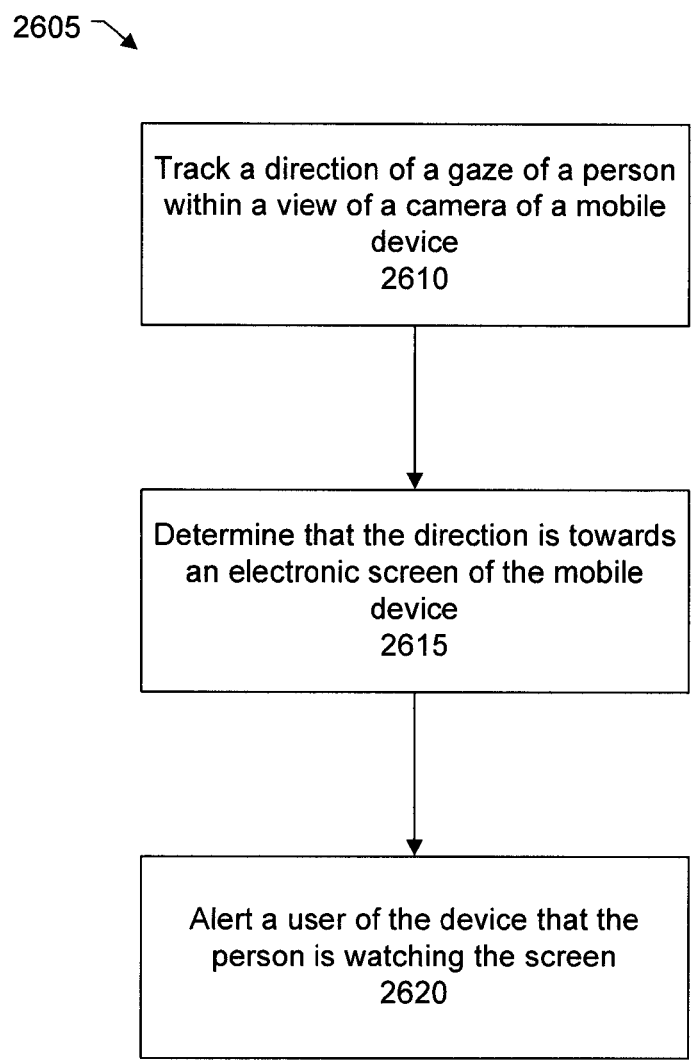
FIG. 26 shows a flow for detecting and responding to a shoulder surfer in the second embodiment of the system.

FIG. 26 shows a flow 2605 for helping a user keep the information shown on the user's mobile device private. In a step 2610, the system tracks a direction of a gaze of a person within a view of a camera of a mobile communications device. The view may be referred to as a field of view or angle of view. The system can track a person who may be on a front side of the device screen, directly facing the screen, indirectly facing the screen, above the screen, below the screen, or off to a side of the screen (e.g., on a left-hand side of the screen or on a right-hand side of the screen). The degree of coverage typically depends on factors such as the type of camera lens (e.g., fisheye, ultra wide angle, wide-angle, normal, long focus, telephoto, or zoom), camera focal length, location of the person with respect to the camera lens, distance between the person and the camera lens, angle of the person with respect to an axis passing through a center of the camera lens, or combinations of these.

In a step 2615, the system can determine or detect that the direction of the person's gaze is towards or at the screen of the device. In a step 2620, upon determining that the direction of the gaze is towards the screen, the system can alert the user, i.e., provide an indication to the user of the device that the person (e.g., shoulder surfer or watcher) is watching the device screen. The types of alerts that may be provided can be as shown in FIG. 14 and described in the discussion accompanying FIG. 14.

In an embodiment, the system can estimate the distance of the potential observer from the device, and given the currently displayed font size on the device for the information can use a configurable parameter to assess whether there is a risk of information on the device being effectively viewed by the observer. E.g., 20/20 vision (based on a Snellen Eye Chart) for the observer allows the observer to read a font size 15 point at a distance of 7 feet, or a font size of 21 point at a distance of 10 feet. For the given font size used for display of information, the system can have a configurable measure of visual acuity for an observer, e.g., 20/10 (which is not unusual), and engage the privacy protection features if the observer is close enough to read the information, else not.

In an embodiment, the system can continuously monitor the area within the view of the device camera to detect shoulder surfing. Upon determining that a person is watching the device screen, the system takes remedial actions to thwart the shoulder surfer such as reducing the visibility of information shown on the screen. Upon detecting the shoulder surfer is no longer a threat, the system can restore the visibility. For example, the system can maintain an obscured or reduced visibility screen state while the shoulder surfer is watching the device screen. Upon determining that the shoulder surfer is no longer watching the device screen (e.g., the shoulder surfer has averted their gaze or turned their gaze away from the device screen), the system can return the screen to an unobscured state. In an embodiment, a different form of remedial action can be to replace the information on the screen with a different display/different information. In this embodiment, the privacy protection system can act as an automatic "boss filter."

FIG. 27 shows a flow 2705 for ignoring a person as a shoulder surfing threat. In a step 2710, the system tracks a direction of a gaze of a person within a view of the mobile device camera. In a step 2715, a determination is made that the direction of the person's gaze is towards an electronic screen of the mobile device. Techniques for gaze tracking are described above (see, e.g., discussion accompanying FIGS. 25 and 26).

In a step 2720, the system determines whether the person should be ignored. In a step 2725, if the person should not be ignored the system alerts the device user that the person is watching the device screen. Techniques to alerting the device user are described above in the discussion accompanying FIG. 14.

In an embodiment, the system can ignore the person as a shoulder surfing threat for a configurable amount of time. Upon expiration of the time, the system can reduce the visibility of information shown on the display in order to keep the information private. The user can configure the time period to be, for example, 20, 30, 40, 50, 60, more than 60 seconds, or less than 20 seconds. In some cases, people may cast a mere glance at the user's screen. Constantly warning the user about these types of short and inadvertent glances can be disruptive. The user may not be concerned with such glances. Rather, the user may be more concerned with people watching the device screen for an extended period of time. Having a configurable time period can help to reduce false alarms. In an embodiment, a method includes determining that the person's gaze direction is towards the device's screen, tracking a duration of the gaze, and if the duration is greater than a threshold time period, alerting the user.

In another embodiment, the user can indicate to the system that the person should be ignored as a shoulder surfing threat for an indefinite period of time. The user may be sharing the device screen with a friend, colleague, relative, son, daughter, or other person that the user knows. For example, the user and a friend may be watching a movie on the device's screen. In cases such as these, the person may be authorized to view the screen. So, the system can be configured to ignore such people. In an embodiment, a method includes determining that a person's gaze is directed at the device screen, determining whether the person is authorized to view the screen, and if not authorized providing an indication to the user that the person is watching the screen.

Determining whether the person is authorized to watch the screen may include prompting the user to indicate whether or not the persons should be authorized. For example, the prompt may include an image of the person, the message text, "This person is watching your screen. Are they authorized?," a "Yes" button, and a "No" button. The user can authorize the person by selecting the "Yes" button. The system stores the selection and the person's image so that the person can be later recognized. After storing the selection, the system may detect that a person is watching the device screen. The system identifies the person using facial recognition techniques, determines that the person is authorized, and does not alert the user because the person is authorized to view the screen.

Alternatively, the user can click the "No" button to indicate that the person is not authorized to view the screen. The system can store the selection and the person's image so that the person can be later recognized. After storing the selection, the system may detect that a person is watching the device screen. The system identifies the person using facial recognition techniques, determines that the person is not authorized, and alerts the user because the person is not authorized to view the screen.

FIG. 28 shows a flow 2805 for preemptive protection. In a step 2810, the system tracks the user's gaze direction. In a step 2815, a determination is made that the direction is away from the device screen. In a step 2820, upon determining that the user's gaze direction is away from the device screen, the system can reduce the visibility of information shown on the screen. As an example, the user may shift their focus from the device screen and look away towards another object (e.g., look out the window of a bus). The system can detect that the user is no longer looking at the screen and reduce the screen visibility (e.g., darken the screen) so that people adjacent to the user will be unable to see the information on the screen. Upon determining that the user's gaze has returned to the screen, the system can restore the screen visibility.

In an embodiment, the user can configure the amount of time between the detection of the loss of gaze of the user and the reduction of screen visibility. For example, the user can configure the time to be 10, 20, 30, 40, 50, 60, more than 60 seconds, or less than 10 seconds. In some cases, the user may not want the screen visibility immediately reduced when the user shifts their gaze away from the screen. Immediately reducing the visibility can be disruptive and annoying if, for example, the user simply looks away for a brief moment. In this embodiment, a method includes determining that a gaze of a user of the mobile device is away from the device's screen, tracking a duration that the gaze is away from the screen, and if the duration is greater than a threshold time period, reducing the screen visibility.

Figure 29:
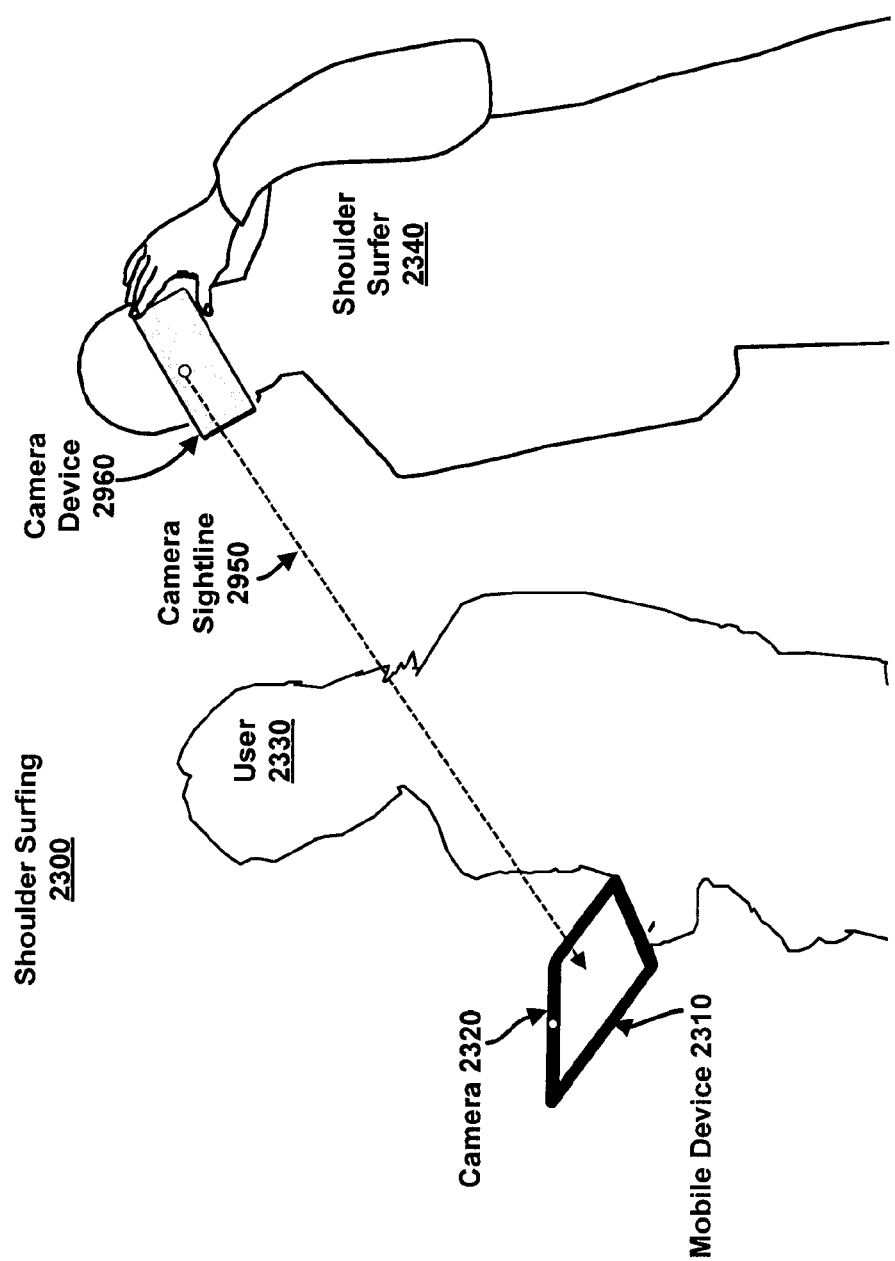
FIG. 29 shows an example of a shoulder surfer using a camera to shoulder surf.

In a different embodiment, as shown in FIG. 29, a watcher or shoulder surfer 2340 may not be looking directly at the user's mobile device 2310 display screen, but rather may be using a camera device 2960 (such as an SLR camera, video camera, smartphone with built-in camera, etc.) to view 2950 the mobile device. The system for recognizing watchers or shoulder surfers can in this embodiment recognize such camera devices and estimate the camera sightline using the same techniques that are used for gaze detection. Thus shoulder surfing with a device can be detected and responded to as described above. Additionally, other viewing assist devices such as binoculars or telescopes can be recognized to detect observation of the display screen by a watcher or shoulder surfer.

In another embodiment the triggering of blanking or obscuring can be performed by the detection of any rapidly moving object(s) in the image available from the camera. For example, a person rapidly walking past the user might not be in view long enough for the camera 2320 to be used to recognize gaze direction. In this instance, the brief blanking or obscuring of the display screen in the presence of objects moving rapidly in the field of view of the camera can provide additional protection.

In an embodiment the recognition of a face within view and gaze recognition can include accounting for reflections from mirrors or other reflective objects within the field of view, such as the user's eyeglasses or beverage glasses on a table.

Figure 30:
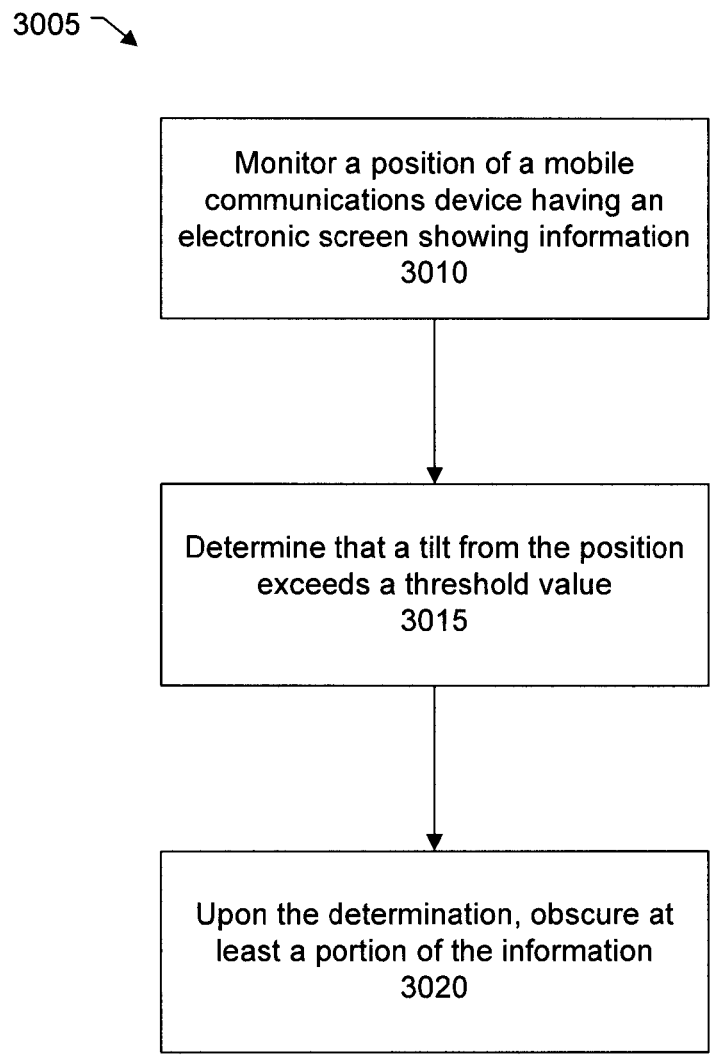
FIG. 30 shows a flow for a third embodiment of a system for preventing shoulder surfing.

FIG. 30 shows a flow 3005 of another specific embodiment of a technique for protecting information shown on a mobile communications device from shoulder surfers. In a step 3010, the system monitors a position of a mobile communications device having an electronic screen showing information. In this specific embodiment, monitoring can include analyzing the output from the mobile device accelerometer, gyroscope, or both.

An accelerometer is a device that measures proper acceleration. Single- and multi-axis models of accelerometer can detect magnitude and direction of the proper acceleration (or g-force), as a vector quantity, and can be used to sense orientation (because direction of weight changes), and coordinate acceleration. A gyroscope is a device for measuring orientation, based on the principles of angular momentum. Mobile devices that integrate a gyroscope and accelerometer can provide accurate recognition of movement (e.g., direction and motion sensing) within a 3D space than an accelerometer alone.

In a step 3015, the system can determine that a tilt from the position exceeds a threshold value. In a specific embodiment, the threshold value ranges from about 5 degrees to about 8 degrees. This includes, for example, 5, 6, 7, or 8 degrees. The threshold can be more than 8 degrees, or less than 5 degrees. The threshold can be user-configurable. In a step 3020, upon the determination that the tilt has exceeded the threshold value, the system can reduce the visibility of at least a portion of the information shown on the screen, e.g., obscure the at least a portion of the information.

In some cases, when a user shifts focus from the mobile device that they are holding to something else, the user may inadvertently tilt the device. In this embodiment, the system can obscure the information to help prevent the information from being seen by others. In other words, in this specific embodiment, rather than changing the view mode from portrait to landscape (or vice versa) to make the information easier to see, the system makes the information harder to see, i.e., obscures the information.

In another specific embodiment, the system may instead or additionally analyze output from the device's accelerometer. In this specific embodiment, if the acceleration is greater than a threshold value, the system can similarly reduce the visibility of the information. In a specific embodiment, the threshold value is about 0.05 meters per second squared. The threshold value, however, can range from about 0.01 meters per second squared to about 0.1 meters per second squared. The threshold can be user-configurable.

The various ideas and concepts presented in this application may be combined, in any combination, with other ideas and concepts presented in this application. For example, the discussion on face recognition can be applicable to identifying shoulder surfers through detecting changes in background. In this specific embodiment, face recognition can be used to identify the user of the mobile communications device in order to distinguish foreground (or user) from background objects.

Whether shoulder surfers are identified by detecting changes in background or through face recognition and gaze analysis can depend on many factors such as available computing resources, application of the system, tolerance for false positives, desired sensitivity, and others. Detecting changes in background can be less computationally intensive than face recognition and gaze analysis. This can be advantageous because mobile computing devices typically have less computing resources (e.g., battery power, available storage, or processing capacity) than desktop devices.

Further, detecting changes in background can offer protection where the shoulder surfer shields their face such as by using their hand or jacket to partially cover their face, peeking out from behind a corner, and so forth. A face recognition technique may fail to detect such a threat because the shoulder surfer's face may be at least partially covered up and thus unrecognizable. Detecting changes in background, however, can identify such a threat because the technique looks for changes in pixels between the reference and target images rather than attempting to recognize a face.

Detecting changes in background can be advantageous in cases where lighting in the environment changes. For example, dimming or turning off the lights in a room in which the user is situated can make it easier for someone to view the information on the screen. The system may trigger an alert because there will be difference in pixel brightness between the reference and target images. Face recognition techniques may be advantageous to help reduce the number of false positives because detecting changes in background may identify background changes unrelated to shoulder surfing (e.g., dog walks behind user).

In an embodiment, detecting changes in background can be applied in cases where the background is constantly changing such as when the user is on the bus. In this embodiment, an algorithm determines that the motion is uniform, is above threshold (e.g., 20 miles per hour to distinguish vehicular movement), or both and can disregard that portion of the image that is in motion. This helps to reduce false positives.

This application describes aspects of the system in connection with a portable electronic device such as smartphone or tablet computer. Principles of the system, however, are also applicable to other types of devices having electronic screens where it is desirable that the information shown on such screens be private. For example, aspects of the system may be implemented in automatic teller machines (ATMs), computer terminals open to the public (e.g., computers in a library), point of sale (POS) checkout devices, and others.

In a specific embodiment, the security and privacy of a user is enhanced by detecting using a camera of the user's device that a person is watching the screen of a mobile device that belongs to a user. An alert is generated to inform the user that the person is watching the screen. The visibility of information shown on the screen may be reduced. The alert may be suppressed if the person is authorized to view the screen. If the user of the device looks away from the screen, the visibility of the information shown on the screen may be reduced to help prevent people from viewing the information.

In an embodiment, a method includes displaying a graphical user interface on an electronic screen of a mobile communications device, the mobile communications device including a camera, using the mobile communications device camera, tracking a direction of a gaze of a person who is not a user of the mobile communication device within a field of view of the camera, determining that the direction is towards the electronic screen, and upon the determining, altering the graphical user interface displayed on the electronic screen.

The step of altering the graphical user interface may include obscuring at least a portion of information displayed on the electronic screen, capturing an image of the person, and displaying the image on the electronic screen, displaying an alert on the electronic screen to inform the user of the mobile communications device that the person is viewing the electronic screen, moving an input box from a first position on the graphical user interface to a second position on the graphical user interface, different from the first position, obscuring a first portion of information displayed on the electronic screen, and not obscuring a second portion of information displayed on the electronic screen, determining that input to a first input field on the graphical user interface should be protected, obscuring the input to the first input field, determining that input to a second input field on the graphical user interface does not need to be protected, and not obscuring the input to the second input field. Altering the graphical user interface displayed on the electronic screen can reduce the visibility of information shown on the electronic screen.

In an embodiment, the method further includes after the step of altering the graphical user interface, determining that the direction of the gaze of the person is not towards the electronic screen, and upon determining that the direction is not towards the electronic screen, undoing the alteration of the graphical user interface.

The method may further include maintaining the alteration of the graphical user interface while the direction of the gaze of the person is towards the electronic screen.

In an embodiment, a method includes displaying a graphical user interface on an electronic screen of a mobile communications device of a user, tracking a direction of a gaze of the user, determining that the direction is away from the electronic screen, and upon determining, altering the graphical user interface displayed on the electronic screen. The method may include maintaining the alteration of the graphical user interface while the direction of the gaze of the user is away from the electronic screen.

In an embodiment, the method further includes after the step of altering the graphical user interface, determining that the direction of the gaze of the user is towards the electronic screen, and upon determining that the direction is towards the electronic screen, undoing the alteration of the graphical user interface. The mobile communications device may include a camera connected to a front surface of the mobile communications device, and the front surface comprises the electronic screen. The user may be holding the mobile communications device.

In an embodiment, a method includes displaying a graphical user interface on an electronic screen of a mobile communications device of a user, the mobile communications device including a camera, tracking a direction of a gaze of a person within a field of view of the camera, determining that the direction is towards the electronic screen, upon the determining the direction of the gaze, determining whether the person is authorized to view the electronic screen, and if not authorized, altering the graphical user interface displayed on the electronic screen. The method may further include if authorized, not altering the graphical user interface.

Determining whether the person is authorized to view the electronic screen may include prompting the user to indicate whether or not the person should be authorized. The method may further include receiving an indication that the person is authorized to view the electronic screen, storing the indication, after the step of storing the indication, identifying a first person viewing the electronic screen as being the person authorized to view the electronic screen, and upon the identification, not altering the graphical user interface. Altering the graphical user interface may include obscuring at least a portion of information displayed on the electronic screen.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment.

What is claimed is:

1. A method comprising:
accessing, by a computing device, information that is to be displayed on a display of the computing device, the accessed information including both potentially sensitive information and non-sensitive information;
parsing the accessed information, by the computing device, to identify the potentially sensitive information and the non-sensitive information by identifying at least one of (a) predetermined data formats as related to potentially sensitive information; (b) data strings indicating the presence of potentially sensitive information; (c) code pertaining to the display of potentially sensitive information; and (d) a data field associated with potentially sensitive information;
obtaining a first image of an area from a front-facing camera of the computing device, the first image having a foreground and a background;
receiving a second image of the area from the front-facing camera, the second image having a foreground and a background;
comparing by the computing device the background of the second image with the background of the first image to identify a change in the background in the second image;
determining whether the change exceeds a predetermined threshold amount;
displaying, by the computing device, the accessed information on the display; and
when the change exceeds the predetermined threshold amount, obscuring, by the computing device, regions of the display where the identified potentially sensitive information is displayed.

2. The method of claim 1 wherein the obscuring step comprises displaying a graphical region over the identified potentially sensitive information.

3. The method of claim 1 further comprising the step of alerting a user of the computing device when the change exceeds the predetermined threshold amount.

4. The method of claim 1 wherein the obscuring step comprises reducing visibility of only those portions of the display where the identified potentially sensitive information is displayed.

5. A method comprising:
accessing, by a computing device, information that is to be displayed on a display of the computing device, the accessed information including both potentially sensitive information and non-sensitive information;
parsing the accessed information, by the computing device, to identify the potentially sensitive information and the non-sensitive information;
obtaining a first image of an area from a front-facing camera of the computing device, the first image having a foreground and a background;

receiving a second image of the area from the front-facing camera, the second image having a foreground and a background;

comparing by the computing device the background of the second image with the background of the first image to identify a change in the background in the second image;

determining whether the change exceeds a predetermined threshold amount;

displaying, by the computing device, the accessed information on the display;

when the change exceeds the predetermined threshold amount, obscuring, by the computing device, regions of the display where the identified potentially sensitive information is displayed; and after the obscuring step, removing the obscuring, by the computing device, of the regions of the display where the identified potentially sensitive information is displayed when a new change in background determination is made using the obtaining a first image step, receiving a second image step, comparing and determining steps and the determined change does not exceed the threshold value.

6. A non-transitory computer readable storage medium having embodied thereon a program, the program being executable by a processor for performing a method comprising:

accessing, by a computing device, information that is to be displayed on a display of the computing device, the accessed information including both potentially sensitive information and non-sensitive information;

parsing the accessed information, by the computing device, to identify the potentially sensitive information and the non-sensitive information by identifying at least one of (a) predetermined data formats as related to potentially sensitive information; (b) data strings indicating the presence of potentially sensitive information; (c) code pertaining to the display of potentially sensitive information; and (d) a data field associated with potentially sensitive information;

obtaining a first image of an area from a front-facing camera of the computing device, the first image having a foreground and a background;

receiving a second image of the area from the front-facing camera, the second image having a foreground and a background;

comparing by the computing device the background of the second image with the background of the first image to identify a change in the background in the second image;

determining whether the change exceeds a predetermined threshold amount;

displaying, by the computing device, the accessed information on the display; and when the change exceeds the predetermined threshold amount, obscuring, by the computing device, regions of the display where the identified potentially sensitive information is displayed.

7. The non-transitory computer readable storage medium of claim 6 wherein the obscuring step comprises displaying a graphical region over the identified potentially sensitive information.

8. The non-transitory computer readable storage medium of claim 6 further comprising the step of alerting a user of the computing device when the change exceeds the predetermined threshold amount.

9. The non-transitory computer readable storage medium of claim 6 wherein the obscuring step comprises reducing visibility of only those portions of the display where the identified potentially sensitive information is displayed.

10. A non-transitory computer readable storage medium having embodied thereon a program, the program being executable by a processor for performing a method comprising:

accessing, by a computing device, information that is to be displayed on a display of the computing device, the accessed information including both potentially sensitive information and non-sensitive information;

parsing the accessed information, by the computing device, to identify the potentially sensitive information and the non-sensitive information;

obtaining a first image of an area from a front-facing camera of the computing device, the first image having a foreground and a background;

receiving a second image of the area from the front-facing camera, the second image having a foreground and a background;

comparing by the computing device the background of the second image with the background of the first image to identify a change in the background in the second image;

determining whether the change exceeds a predetermined threshold amount;

displaying, by the computing device, the accessed information on the display;

when the change exceeds the predetermined threshold amount, obscuring, by the computing device, regions of the display where the identified potentially sensitive information is displayed; and after the obscuring step, removing the obscuring, by the computing device, of the regions of the display where the identified potentially sensitive information is displayed when a new change in background determination is made using the obtaining a first image step, receiving a second image step, comparing and determining steps and the determined change does not exceed the threshold value.

* * * * *